US010970340B2

(12) United States Patent
Tiwary et al.

(10) Patent No.: US 10,970,340 B2
(45) Date of Patent: Apr. 6, 2021

(54) NETWORK VIRTUALIZATION FOR WEB APPLICATION QUERIES

(71) Applicant: SAP SE, Walldorf (DE)

(72) Inventors: Mayank Tiwary, Odisha Rourkela (IN); Sabyasachi Dhal, Bangalore (IN)

(73) Assignee: SAP SE, Walldorf (DE)

( * ) Notice: Subject to any disclaimer, the term of this patent is extended or adjusted under 35 U.S.C. 154(b) by 364 days.

(21) Appl. No.: 15/492,404

(22) Filed: Apr. 20, 2017

(65) Prior Publication Data

US 2018/0307757 A1 Oct. 25, 2018

(51) Int. Cl.
| | |
|---|---|
| *G06F 16/951* | (2019.01) |
| *H04L 29/08* | (2006.01) |
| *H04L 12/803* | (2013.01) |
| *H04L 12/721* | (2013.01) |
| *H04L 12/851* | (2013.01) |
| *G06F 16/22* | (2019.01) |

(Continued)

(52) U.S. Cl.
CPC .......... *G06F 16/951* (2019.01); *G06F 9/5077* (2013.01); *G06F 16/2282* (2019.01); *H04L 41/0253* (2013.01); *H04L 41/22* (2013.01); *H04L 43/0876* (2013.01); *H04L 45/125* (2013.01); *H04L 45/38* (2013.01); *H04L 47/125* (2013.01); *H04L 47/2441* (2013.01); *H04L 67/02* (2013.01); *H04L 67/327* (2013.01)

(58) Field of Classification Search
CPC ............... G06F 16/951; G06F 16/2282; G06F 9/45558; G06F 9/5077; G06F 17/30864; G06F 17/30067; G06F 17/30545; G06F 17/30595; H04L 41/0253; H04L 41/22; H04L 43/0876; H04L 45/38; H04L 47/125; H04L 47/2441; H04L 47/621; H04L 49/3027; H04L 67/02; H04L 67/327; G06Q 30/02

See application file for complete search history.

(56) References Cited

U.S. PATENT DOCUMENTS

| | | | | |
|---|---|---|---|---|
| 6,633,835 | B1 * | 10/2003 | Moran | ..................... H04L 47/10 702/181 |
| 2005/0234683 | A1 * | 10/2005 | Graves | .................... H04L 41/12 703/1 |

(Continued)

*Primary Examiner* — Ashish Thomas
*Assistant Examiner* — Suman Rajaputra
(74) *Attorney, Agent, or Firm* — Schwegman Lundberg & Woessner, P.A.

(57) ABSTRACT

Various examples are directed to systems and methods for network virtualization for web applications. For example, a WAN controller may receive from a backend query processor, a first tenant user query table that describes a first set of query types for a first user. The first set of query types may comprises a first query type having a first computational weight and a second query type having a second computational weight less than the first computational weight. The WAN controller may determine that a first network path to a web application data center is less congested that a second network path to the web application data center. The WAN controller may send a first flow entry to a first network appliance on the first network path instructing the first network appliance on the first network path to send packets associated with queries of the first set of query types to a second network appliance on the first network path.

20 Claims, 12 Drawing Sheets

(51) Int. Cl.
*H04L 12/24* (2006.01)
*H04L 12/26* (2006.01)
*G06F 9/50* (2006.01)
*H04L 12/729* (2013.01)

(56) References Cited

U.S. PATENT DOCUMENTS

| | | | |
|---|---|---|---|
| 2013/0336229 A1* | 12/2013 | Kakadia | H04W 72/1257 370/329 |
| 2014/0033212 A1* | 1/2014 | Balasubramaniam | G06F 9/5038 718/102 |
| 2014/0101306 A1* | 4/2014 | Murgia | H04L 47/125 709/224 |
| 2016/0080251 A1* | 3/2016 | Ramachandran | G06F 16/285 370/389 |

\* cited by examiner

NETWORK VIRTUALIZATION FOR WEB APPLICATION QUERIES

TECHNICAL FIELD

This document generally relates to methods and systems for use with computer devices, including networked computing devices. More particularly, this document relates to systems and methods for utilizing network virtualization in a web application environment.

BACKGROUND

Network virtualization is used to increase the configurability of network appliances, such as routers, switches, etc., that make up a computing network. Control plane components, often implemented in software, provide instructions to data plane components, such as hardware network appliances. The instructions provide the network appliances with rules for treating incoming packets.

BRIEF DESCRIPTION OF DRAWINGS

The present disclosure is illustrated by way of example and not limitation in the following figures.

DETAILED DESCRIPTION

Figure 1:
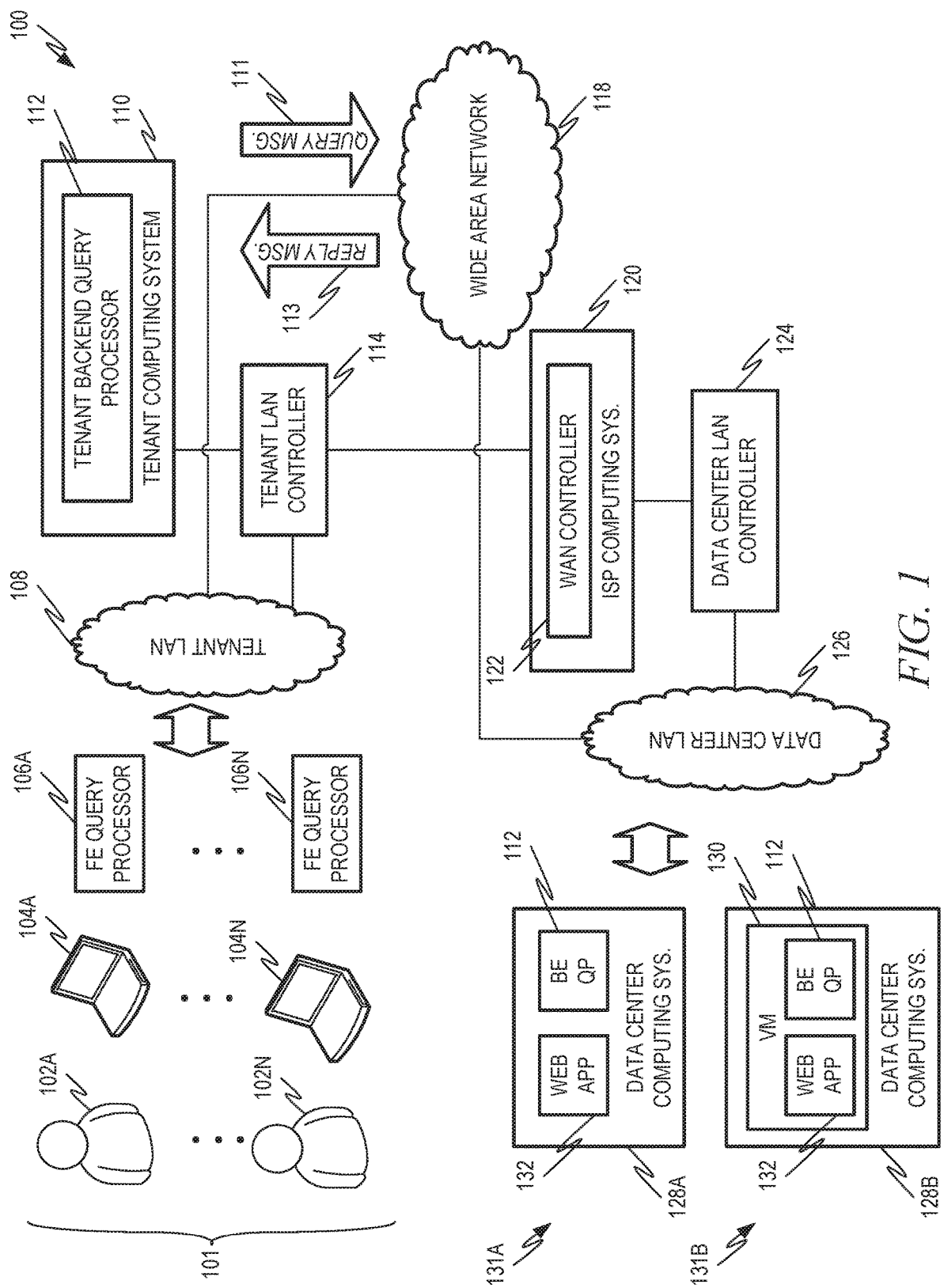
FIG. 1 is a diagram showing one example of an environment for implementing network virtualization for web application queries.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Various examples described herein are directed to systems and methods for implementing network virtualization in a web application environment. In a web application environment, a web application executes at a web application machine, which may be a physical or virtual machine. A user of the web application accesses the web application, for example, through a web browser executing at a user computing device. The user, through the web browser, sends a query to the web application requesting that the web application perform a particular processing task. The web application performs the requested processing task and sends a query reply back to the requesting user.

One example of a web application environment is the Business One Cloud suite of applications available from SAP SE of Waldorf. Germany. A user may have a set of queries that the user is permitted to make of the web application. When the web application includes an Enterprise Resource Planning (ERP) application, such as the Business One Cloud suite of applications, example queries may include a request to view a purchase order, a request to view an inventory status, a request to add an invoice to an invoice record, etc.

In various examples, users of the web application are associated with different tenants. Tenants include businesses or other organizations that utilize the web application. Users associated with a tenant may include employees, contractors, or other individuals associated with the organization. In one example, a tenant business may utilize an ERP web application to manage its accounts receivable. Employees of the tenant business may be users who are permitted to send queries to the ERP web application, for example, to enter an account receivable, to check the status of certain accounts receivable, etc. ERP and other types of web applications may respond to queries of this type and other types, for example, depending on the particular implementation.

A tenant may maintain internal network infrastructure, such as a tenant LAN, from which users associated with the tenant may access the web application. Accordingly, a user query may traverse several networks between the user's computing device and the web application machine. These networks may include, for example, a tenant LAN maintained by the tenant, a WAN such as the Internet, a data center LAN maintained at the data center that implements the web application machine, etc.

The number and mix of queries directed to a web application may change over time. For example, not all users of the web application are active at any given time. Also, user permissions may change with time. For example, a user that is not permitted to make a particular query at one time may later be permitted to make that query. This means that static network configurations may not always operate at an acceptable level of efficiency.

Various examples described herein implement network virtualization to allow one or more of the networks traversed by web application queries to be configured based on how the web application is being queried at any particular time. This may increase the efficiency of the networks for the web applications.

Users may access the web application from user computing devices that execute a front end query processor. When the user makes a query, the front end query processor sends the query to the web application machine that is executing the web application as a query message. The front end query processor may direct the query message to a particular port of the web application machine, such as a transport control protocol (TCP) port. The selected port may indicate a type of the query. For example, the front end query processor may direct query messages including queries of a first type to a first port of the web application machine; it may direct query messages including queries of a second type to a second port of the web application machine, and so on.

Various network controllers may be programmed to modify network appliances of the various networks transporting query messages to direct and prioritize the packets making up the query message. (Packets making up a query message are also referred to herein as query message packets.) For example, a tenant LAN controller may configure network appliances of the tenant LAN to assign query message packets to one of a set of queues. The particular queue to which a query message is assigned may be determined, for example, by the query type (e.g., indicated by the port to which the query message is directed). A WAN controller may configure network appliances of the WAN to select network paths for query message packets, for example, based on query type (e.g., indicated by the port to which the query message is directed, the queue to which the tenant LAN assigned query network packets, etc.) A data center LAN controller may configure network appliances of the data center LAN to direct query message packets, for example, based on query type, user, tenant, etc.

FIG. 1 is a diagram showing one example of an environment 100 for implementing network virtualization for web application queries. The example shown in FIG. 1 shows a single tenant 101, including users 102A, 102N, user computing devices 104A, 104N, front end query processors 106A, 106N executing at the user computing devices 104A, 104N, a tenant LAN 108, and related infrastructure 114, 110, 112. In various examples, however, additional tenants may be included in the environment 100. Also, in different examples, tenants may include more, fewer, and/or different arrangements of components than what is shown in FIG. 1.

Users 102A, 102N utilize user computing devices 104A, 104N to send queries to a web application 132, which may execute at a web application machine 131A, 131B. Although two users 102A, 102N and user computing devices 104A, 104N are shown, the tenant 101 may include any suitable number of users and/or user computing devices. The user computing devices 104A. 104N may be or include any suitable type of computing devices including, for example, laptop computers, desktop computers, tablet computers, mobile computing devices, etc.

In some examples, when a user 102A, 102N requests a query, a front end query processor 106A, 106N executing at the user's computing device 104A, 104N generates a query message 111 including the query and sends the query message 111 to the web application machine 131A, 131B. In some examples, the front end query processors 106A, 106N are or include a script or other interpreted language instructions executed through a web browser executing at the user computing device 104A, 104N.

In some examples, the front end query processor 106A, 106N determines type of the requested query and directs the query message 111 to a port (e.g., a TCP port) of the web application machine 131A, 131B that corresponds to the query type. For example, query messages including queries of a first type may be directed to the web application machine 131A, 131B at a first port, query messages including queries of a second type may be directed to the web application machine 131A, 131B at a second port, and so on. As a part of sending the query message 111, the user computing device 104A, 104N may break the query message 111 into query message packets. The query message packets may include various metadata describing the query message 111, including the port to which it is directed.

The query message 111 is directed to a web application machine. FIG. 1 shows two web application machines 131A, 131B demonstrating different example implementations. For example, web application machine 131A includes a data center computing system 128A that executes the web application 132. Web application machine 131B includes a data center computing system 128B that hosts a virtual machine (VM) 130 where the VM 130 executes the web application 132. Data center computing devices 128A, 128B may be or include servers or other suitable computing devices. Data center computing devices 128A, 128B may be positioned at a single geographic location or across multiple geographic locations.

Upon receiving the query message 111, the web application 132 executes the included query and, in some examples, sends a reply message 113 to the user 102A, 102N including results of the query. Executing the query may include performing any suitable type of processing. For example, queries to an ERP web application may include, for example, database queries regarding stored purchase orders, inventory levels, customer records, accounts receivable, etc.

Between the user 102A, 102N and the web application 132, the query message 111 is communicated by several networks. A tenant LAN 108 may be implemented by the tenant 101. For example, where the tenant 101 is an organization, such as a business, the tenant LAN 108 may be or include an internal network of the organization. The WAN 118 may include the Internet. In some examples, the WAN 118 also includes network components implemented by an Internet Service Provider (ISP) or other intermediate connection between the tenant LAN 108 and the Internet. Query messages 111 may pass through the WAN 118 to a data center LAN 126 implemented at a data center hosting the web application 132.

Figure 2:
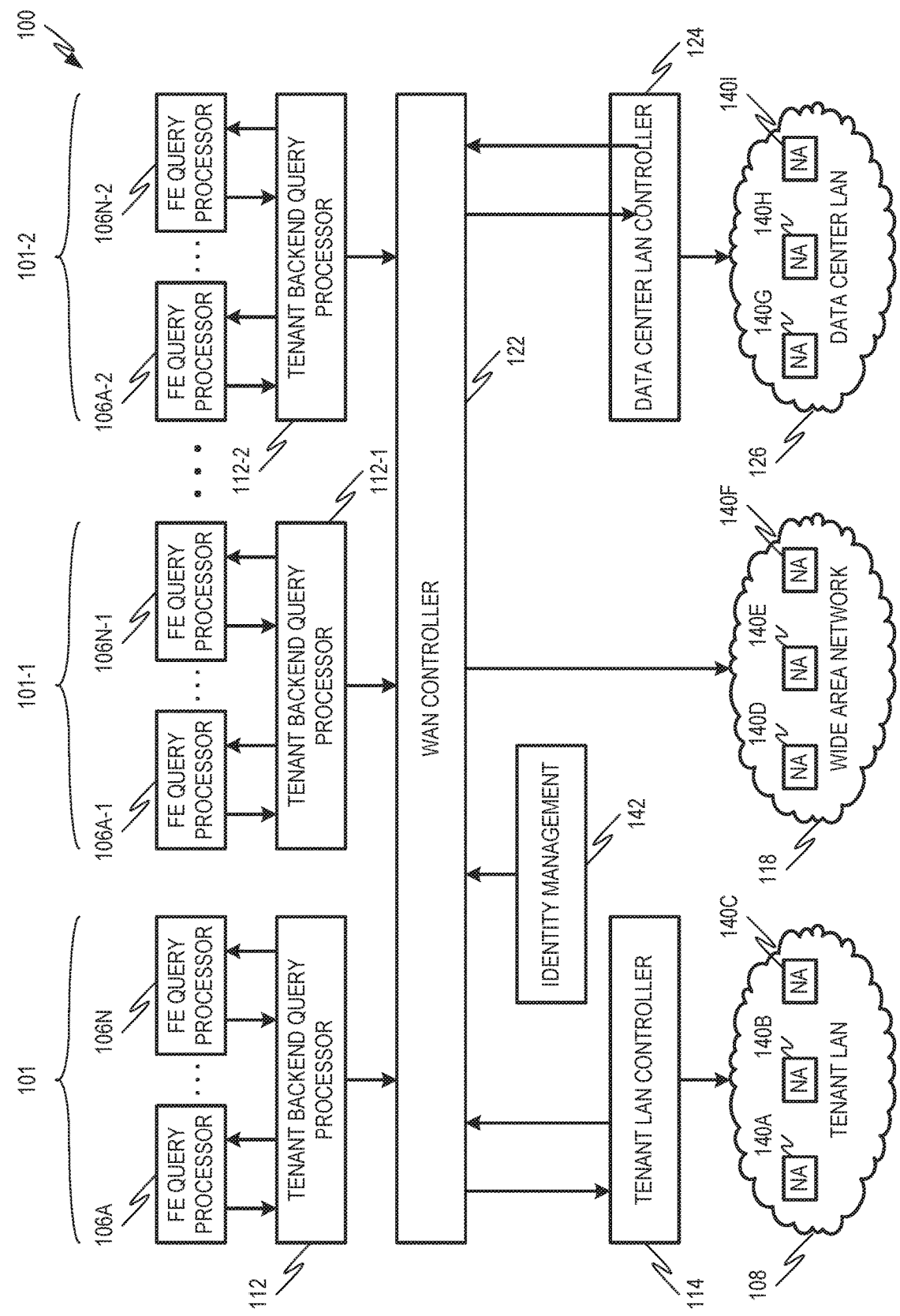
FIG. 2 is a diagram showing another example of the environment of FIG. 1.

The various networks 108, 118, 126 may include various interconnected network appliances, described in more detail with respect to FIG. 2. Network controllers 114, 122, 124 may configure the network appliances of the various networks 108, 118, 126 to direct and prioritize the packets making up queries 111, for example, based on current conditions.

In some examples, the network controllers 114, 122, 124 utilize information about user queries that is generated by a tenant backend query processor 112. The tenant backend query processor 112 may execute at a tenant computing system 110, which may include any suitable server or other computing device. The tenant computing system 110 may be located at a single physical location or distributed across multiple physical locations. In some examples, the tenant backend query processor 112 executes at a data center computing system 128A, 128B. For example, the tenant backend query processor 112 may execute at a virtual machine or VM 130 or other computing system 128A, 128B that also executes the web application 132, for example, as a module of the web application 132.

The tenant backend query processor 112, in some examples, monitors the queries made by users 102A, 102N of the tenant 101 and/or the queries that the users 102A, 102N are permitted to make. The tenant backend query processor 112 may analyze the queries that the users 102A, 102N are permitted to make and classify those queries with a query type. The query type of a query may indicate the computational weight of the query. The computational weight of a query may describes the processing resources that would be used by the web application 132 to process the query. In some examples, the tenant backend query processor 112 provides query type data to one or more of the front end query processors 106A, 106N in the form of a tenant user query table. The tenant user query table may indicate, for example, a description of the queries that different users 102A, 102N are permitted to make and the types of the respective queries. The tenant user query table may be provided, for example, to the WAN controller 122, the tenant LAN controller 114 and/or to other suitable components of the environment 100 that may use the tenant user query table to configure the networks 108, 118, 126. In some examples, the tenant backend query processor 112 also provides front end query processors 106A, 106N with classification data indicating the types of various queries that may be made by users 102A, 102N as well as the ports to which query messages including those queries should be directed.

In some examples, the tenant backend query processor 112 provides the tenant user query table to the WAN controller 122. The WAN controller 122 may be executed, for example, at any suitable computing device, such as an Internet Service Provider (ISP) computing system 120. Similar to the data center computing devices 128A, 128B, the ISP computing system 120 may be or include any suitable computing device such as, for example, a server. Also, the ISP computing system 120 may be at a single physical location or distributed across multiple physical locations. In some examples, the WAN controller 122 may be executed at one of the data center computing devices 128A, 128B that execute the web application 132.

The WAN controller 122, in some examples, receives tenant user query table from multiple tenant backend query processors, such as 112, associated with different tenants. This is illustrated in more detail in FIG. 2. The WAN controller 122 may compile the tenant user query tables to generate the multi-tenant user query table. In some examples, the WAN controller 122 sends the multi-tenant user query table to the data center controller 124 and/or to the tenant LAN controller 114.

The multi-tenant user query table may include a list of users, such as users 102A, 102N, and of the different types of queries that that the users are permitted to make. An example of the multi-tenant user query table is provided in TABLE 1 below:

TABLE 1

Example Multi-tenant user query table

| User ID | L1 Query | L2 Query | L3 Query | Tenant Public IP | User Public IP |
|---|---|---|---|---|---|
| XXXX | XXXX | XXXX | XXXX | XXXX | XXXX |

TABLE 1 shows example columns that a multi-tenant user query table may have. Rows of the multi-tenant user query table, also called records, may include fields, with one field for each column. For example, the User ID field of a record may include an indicator of the corresponding user 102A, 102N. The L1 Query, L2 Query, L3 Query fields may include identifiers of different types of queries that the user 102A, 102N is permitted to make. In the example of TABLE 1, three types of queries are classified, L1 queries, L2 queries, and L3 queries. In this example, L1 queries have the highest computational weight, L2 queries have the next highest computational weight, and L3 queries have the lowest computational weight. In various examples, however, different numbers and arrangements of query types may be used.

A multi-tenant user query table record in the example of TABLE 1 may also include a tenant public IP field that indicates an address of the tenant 101 with which the user 102A, 102N is associated. For example, the tenant public IP field may indicate an internet protocol (IP) or other suitable network address of an edge network appliance of the tenant LAN 108. The user public IP field may include an IP or other suitable network address of the user 102A, 102N. For example, the user public IP field may indicate a network address of the user computing device 104A, 104N to which a reply 113 should be directed. In some examples, some or all of the fields of the multi-tenant user query table may be reflected in the query message packets making up a query message, such as the query message 111. For example, user ID, tenant public IP and user public IP may be included in packet headers. The type of a query may be reflected in the packet header too, for example, by the TCP port or other port to which the packet is directed. For example, the front end query processor 106A may direct query messages including L1 queries to a first port, query messages including L2 queries to a second port, and query messages including L3 queries to a third port.

In some examples, in addition to compiling and distributing the multi-tenant user query table, the WAN controller may manage queries 111 traversing the WAN 118. For example, the WAN controller 122 may identify network paths via the WAN 118 having different bandwidths and congestion levels, for example, based on current network conditions. The WAN controller 122 may configure one or more network appliances of the WAN 118 to assign packets from queries of different types to different network paths. For example, packets from query types having higher computational weights, more favored tenants or users, etc., may be assigned to faster and/or less congested network paths while packets from query types having lower computational weights, less favored tenants or users, etc., may be assigned to relatively slower or more congested network paths.

The tenant LAN controller 114 may receive the multi-tenant user query table from the WAN controller 122. In some examples, the tenant LAN controller 114, instead of receiving the multi-tenant user query table from the WAN controller 122 may receive a tenant user query table, for example, from the tenant backend query processor 112 associated with the tenant 101. For example, the tenant LAN controller 114 may not need to know the user queries that users from other tenants (FIG. 2) are permitted to make and, therefore, the tenant user query table from the tenant backend query processor 112 may be sufficient. Based on the multi-tenant user query table and/or multi-tenant user query table update data, the tenant LAN controller 114 may configure network appliances of the tenant LAN 108. For example, the tenant LAN controller 114 may configure network appliances of the tenant LAN 108 to assign query message packets corresponding to queries of different types to different respective queues. Packets from query messages including queries of a first type may be assigned to a first queue, packets from query messages including queries of a second type may be assigned to a second queue, and so on.

The data center LAN controller 124 may also receive the multi-tenant user query table from the WAN controller 122.

The data center LAN controller 124, in some examples, executes at one or more of the data center computing devices 128A, 128B. The data center LAN controller 124 may configure network appliances of the data center LAN to direct query message packets, for example, based on query type, user, tenant, etc. In some examples, the data center LAN controller 124 is also programmed to upgrade and/or downgrade query message packets from a particular user 102A, 102N, for example, depending on the user's activity level (e.g., how many queries the user 102A, 102N has sent within a given time period).

FIG. 2 is a diagram showing another example of the environment 100. For example, FIG. 2 shows components for supporting queries from multiple example tenants 101, 101-1, 101-3. The front end query processors 106A, 106N and tenant backend query processor 112 may support the first tenant 101. Front end query processors 106A, 106N may support users 102A, 102N, as shown in FIG. 1. The front end query processors 106A-1, 106N-1 and tenant backend query processor 112-1 may support a second tenant 101-1. The front end query processors 106A-2, 106N-2 and tenant backend query processor 112-2 may support a third tenant 101-2. The tenant backend query processors 112, 112-1, 112-2 may generate tenant user query tables, as described above, and provide the tenant user query tables to the WAN controller 122, which may generate the multi-tenant user query table, as described herein.

FIG. 2 shows a single tenant LAN controller 114 and tenant LAN 108, which may be associated with the tenant 101. In some examples, tenants 101-1, 101-2 include separate tenant LANs and tenant LAN controllers (not shown in FIG. 2). Also, although components for three tenants 101, 101-1, 101-2 are shown in FIG. 2, any suitable number of tenants may be supported.

FIG. 2 also shows various network appliances 140A, 140B, 140C. 140D, 140E, 140F, 140G, 140H, 140I that are components of the networks 108, 118, 126, as shown. Although three network appliances 140A, 140B, 140C. 140D, 140E, 140F, 140G, 140H, 140I are shown in each network 108, 118, 126, in practice, networks 108, 118, 126 may include more or fewer than three network appliances. Network appliances 140A, 140B, 140C, 140D, 140E, 140F, 140G, 140H, 140I may be any suitable network hardware for processing packets, such as query packets. For example, some or all of the network appliances 140A, 140B, 140C, 140D, 140E, 140F, 140G, 140H, 140I may be or include switches, routers, hubs, etc.

Network appliances 140A, 140B, 140C, 140D, 140E, 140F, 140G, 140H, 140I may accept flow entries from the respective network controllers 114, 122, 124. A flow entry may include packet identification data and rule data. Packet identification data may identifies a packet or type of packet and the rule data may describe how the network appliance 140A, 140B, 140C, 140D, 140E, 140F, 140G, 140H, 140I is to process the packet.

Example packet identification data may include, for example, a user identifier of the sender, an IP or other network address of the sender, a Media Access Control (MAC) address of the user computing device of the sender, a destination name, a destination IP or other network address, an IP or other address of the host or subnet from which the packet originated, a port number, a queue identifier, etc. In some examples, some or all of the packet identification data may be written to a header of the packet such that the network appliance 140A, 140B, 140C, 140D, 140E, 140F, 140G, 140H, 140I may determine whether any particular packet meets the packet identification data by comparing the packet identification data to the packet header.

Rule data may describe an action or actions that a network appliance 140A, 140B, 140C, 140D, 140E, 140F, 140G, 140H, 140I is to take with respect to a packet identified by packet identification data. Example actions include, sending the packet to another specified network appliance 140A, 140B, 140C, 140D, 140E, 140F, 140G, 140H, 140I, sending the packet to network controller (such as controllers 114, 122, 124), adding the packet to a particular queue, queueing the packet, etc.

For example, a flow entry to a network appliance 140A, 140B, 140C, 140D, 140E, 140F, 140G, 140H, 140I may specify that all query packets from a particular user 102A, 102N to a particular port are to be assigned to a particular queue. Another flow entry to a network appliance 140A, 140B, 140C, 140D, 140E, 140F, 140G, 140H, 140I may specify that all query packets assigned to a particular queue are to be routed to a specified other network appliance 140A, 140B, 140C, 140D, 140E, 140F, 140G, 140H, 140I. In some examples, flow entries for the network appliances 140A, 140B, 140C, 140D, 140E, 140F, 140G, 140H, 140I are configured according to a software defined network (SDN) protocol, such as OpenFlow protocol maintained by the OpenFlow Foundation.

FIG. 2 also shows an identity management system 142. The identity management system 142, in some examples, is in communication with the respective tenant backend systems 112, 112-1, 112-2 to provide user information. For example, the identity management system 142 may provide the backend systems 112, 112-1, 112-2 with a list of queries that may be requested by a particular user or users. The identity management system 142 may be executed, for example, at a dedicated computing device, at a data center computing device, such as one of data center computing devices 120, 128A, 128B. In some examples, some or all tenants may execute a dedicated identity management system 142 specific to users of that tenant.

Figure 3:
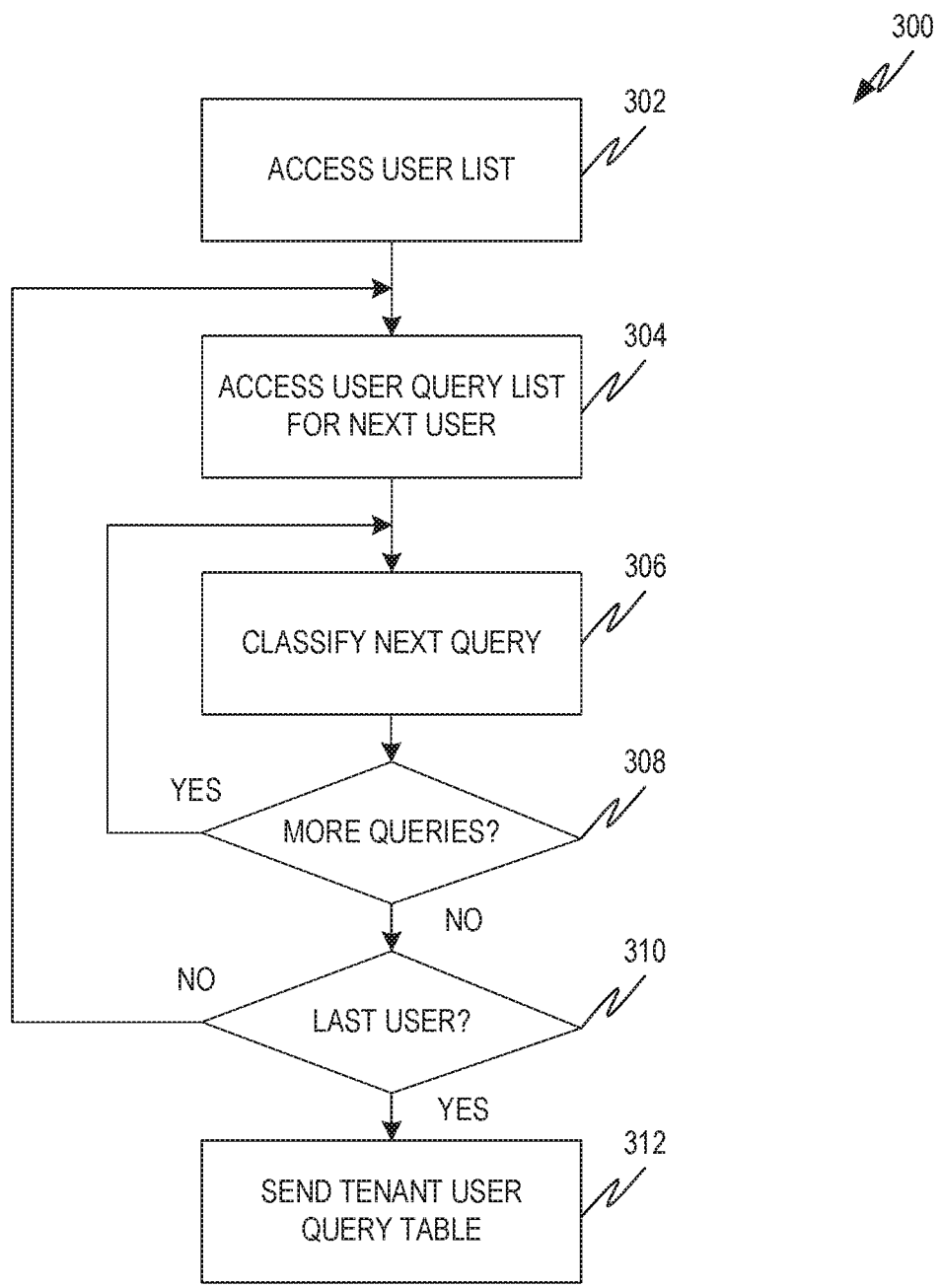
FIG. 3 is flowchart showing one example of a process flow that may be executed by a tenant backend query processor, such as one of the tenant backend query processors to classify the queries that different users are permitted to request.

FIG. 3 is flowchart showing one example of a process flow 300 that may be executed by a tenant backend query processor, such as one of the tenant backend query processors 112, 112-1, 112-2, to classify the queries that different users are permitted to request. The process flow 300 is described with respect to the tenant backend query processor 112 and tenant 101, although the process flow 300 may be executed with respect to any of the tenant backend query processors 112, 112-1, 112-2 at any of the tenants 101, 101-1, 101-2. In some examples, tenant backend query processors 112, 112-1, 112-2 may execute the process flow 300 periodically. For example, users may change with time and the queries permitted to certain users may also change with time. Periodically executing the process flow 300 may allow the tenant backend query processors 112, 112-1, 112-2 and WAN controller 122 to maintain an up-to-date multi-tenant user query table.

At operation 302, the tenant backend query processor 112 may access a user list. The user list may indicate the users associated with the tenant 101 who are permitted to make queries. The user list, in some examples, may also indicate one or more queries that each user is permitted to make. In the example of FIG. 1, then, the backend query processor 112 accesses a user list that indicates the user 102A and the queries that the user 102A is permitted to make. The user list may also indicate the user 102N and the queries that the user 102N is permitted to make. In some examples, the user list is received from the identity management system 142 (FIG. 2).

At operation 304, the tenant backend query processor 112 may retrieve a permitted query list for a current user from the user list. The permitted query list may indicate queries that the current user is permitted to make. The tenant backend query processor 112 may retrieve the permitted query list from the user list, from the identity management system 142 or from any other suitable system. At operation 306, the tenant backend query processor 112 may classify the next query on the permitted query list. Classifying the query may include assigning the query to one of a set of query types, for example, based on computational weight. Additional examples demonstrating classification of queries are described herein with respect to FIG. 4. In different examples, the tenant backend query processor 112 classifies queries into any suitable number of types, such as two types, three types, etc. As queries are classified, the tenant backend query processor 112 may generate a tenant user query table, for example, similar to TABLE 1 above but including records for users considered by the backend query processor 112.

At operation 308, the tenant backend query processor 112 may determine if there are any queries from the permitted query list accessed at operation 304 that have yet to be classified. If yes, the tenant backend query processor 112 may return to operation 306 and classify the next query for the considered user. If no permitted queries for the user remain (e.g., if all permitted queries for the user have already been classified), then the tenant backend query processor 112 may, at operation 310, determine if the current user is the last user from the user list accessed at operation 302. If not, the tenant backend query processor 112 may return to operation 304 and access a permitted query list for the next user from the user list. If the current user is the last user, the tenant backend query processor 112 may, at operation 312, send the tenant user query table, for example, to the WAN controller 122. The tenant backend query processor 112 may generate multi-tenant user query table update data at operation 312.

Figure 4:
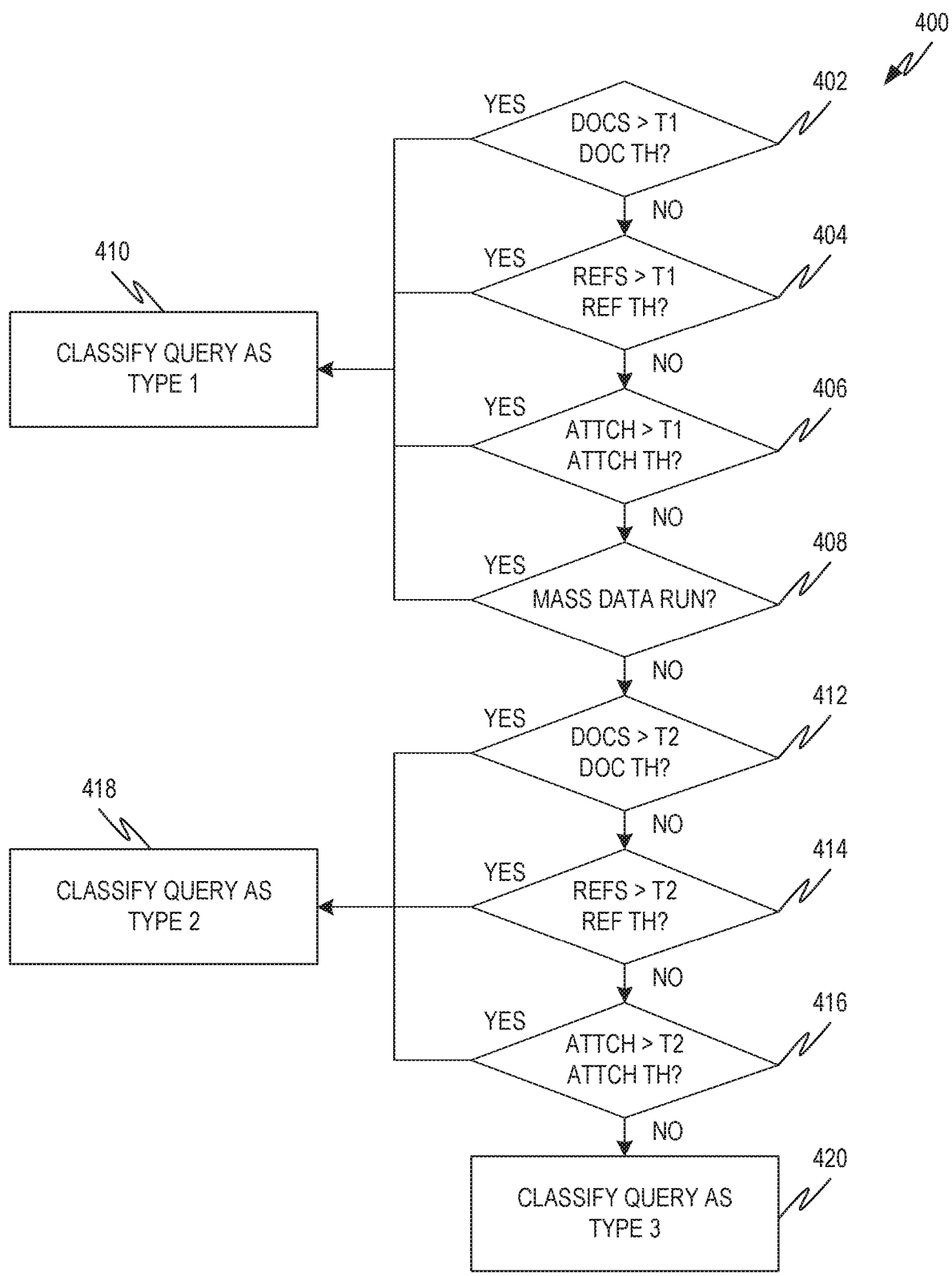
FIG. 4 is a flowchart showing one example of a process flow that may be executed by a tenant backend query processor to classify a query with a query type.

FIG. 4 is a flowchart showing one example of a process flow 400 that may be executed by a tenant backend query processor 112, 112-1, 112-2 to classify a query with a query type. The process flow 400 is one example way that a tenant backend query processor 112, 112-1, 112-2 may execute the operation 306 of the process flow 300 of FIG. 3. The process flow 400 is described with respect to the tenant backend query processor 112, although the process flow 400 may be executed with respect to any of the tenant backend query processors 112, 112-1, 112-2. Also, the process flow 400 contemplates an example where queries are classified into one of three types. The three example query types are referred to herein as type 1, type 2, and type 3, although any suitable names may be used. In some examples, queries may be classified into more or fewer types. In addition, the process flow considers various query properties that may tend to indicate computational weight such as the number of attached documents, the number of references, the total number of attachments, whether the query calls for a mass data run, etc. These are just a few examples of query properties that may indicate computational weight. Any other suitable properties or combination of properties may be used.

At operation 402, the tenant backend query processor 112 determines if the considered query includes greater than a type 1 document threshold number of documents attached to the query. A document may be attached to a query, for example, if the document is to be processed with the query. In one example where the web application 132 includes an ERP function, a query may include an attached invoice, bill, etc. to be processed for inclusion into the ERP system. The attached invoice, bill, or other document may be an attached document counted at operation 402. If the number of attached documents exceeds the type 1 document threshold, then, at operation 410, the tenant backend query processor 112 may assign the query to type 1.

If the number of documents attached to the query is below the type one threshold, the tenant backend query processor 112 may determine, at operation 404, if the number of references in the query exceeds a type one reference threshold. If the number of references exceeds the type 1 reference threshold, then the query is classified as type 1 at operation 410. If not, the tenant backend query processor 112 may determine, at operation 406, if the number of attachments for the query exceeds a type 1 attachment threshold. Attachments to a query may include, for example, attached documents as well as other attachments, such as photographs, video, etc. If the number of attachments is greater than the type 1 attachment threshold, then the query is classified as type 1 at operation 410. If not, the tenant backend query processor 112 may determine at operation 408 if the query requests a mass data run. A mass data run may occur, for example, if the query combines multiple queries into a single batch query. If yes, then the query is classified as type 1. If not, the tenant backend query processor 112 proceeds to operation 412.

At operation 412, the tenant backend query processor 112 may determine if the number of documents attached to the query exceeds a type 2 document threshold, which may be less than the type 1 document threshold. If so, the query is classified as type 2 at operation 418. If not, at operation 414, the tenant backend query processor 112 may determine whether the number of references in the query is greater than a type 2 query threshold, which may be less than the type 1 reference threshold. If so, then the query is classified as type 2 at operation 418. If not, then the tenant backend query processor 112 may determine, at operation 416, whether the number of attachments to the query exceeds a type 2 attachment threshold, which may be less than the type 1 attachment threshold. If yes, the query is classified as type 2 at operation 418. If not, then the query is classified as type 3 at operation 420.

Figure 5:
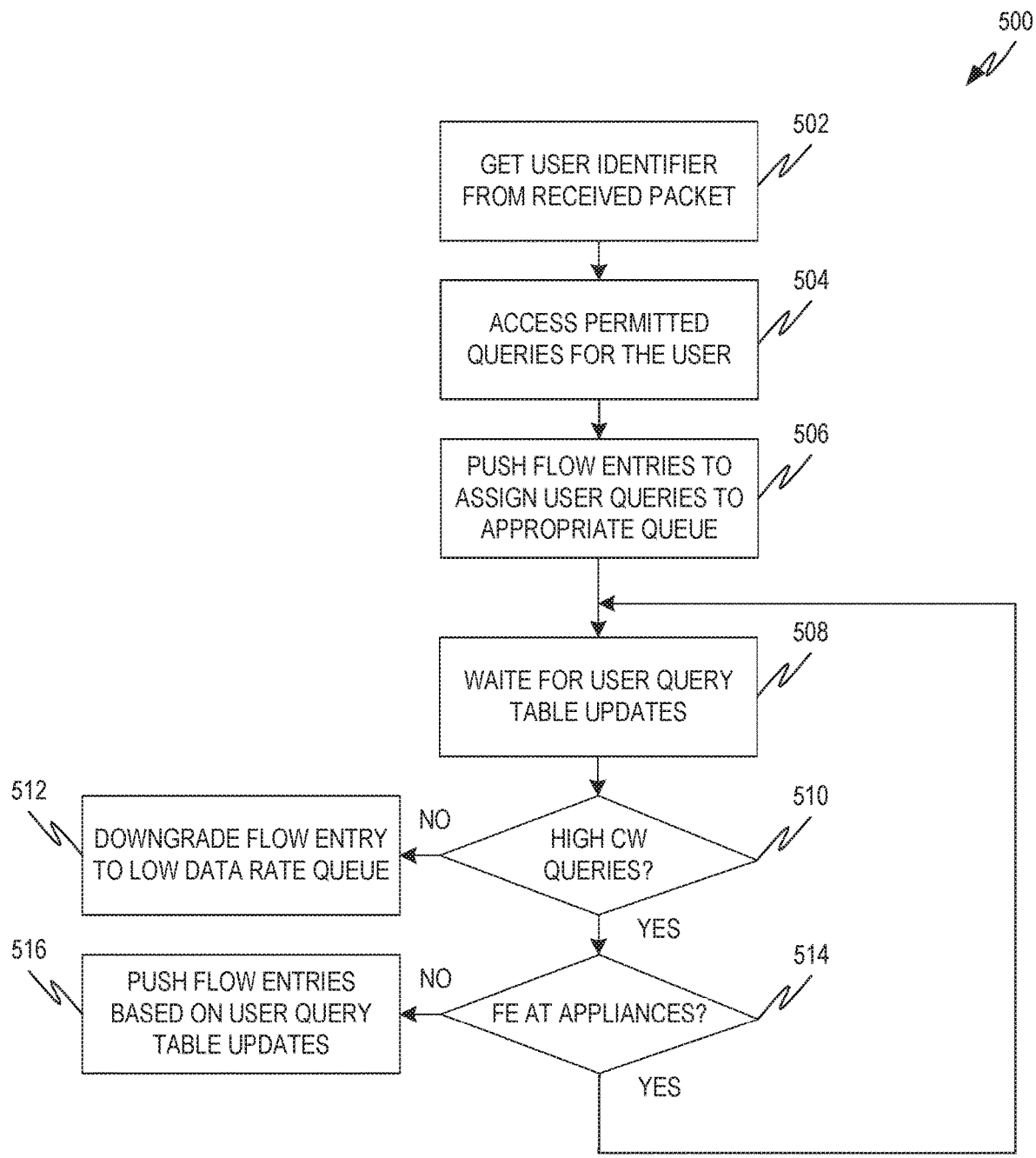
FIG. 5 is a diagram showing one example of a process flow that may be executed by a tenant local area network (LAN) controller of FIG. 1 to configure a tenant LAN.

FIG. 5 is a diagram showing one example of a process flow 500 that may be executed by a tenant LAN controller 114, 114-1, 114-2 to configure a tenant LAN, such as the tenant LAN 108. In some examples, a tenant LAN controller 114, 114-1, 114-2 concurrently executes multiple examples of the process flow 500, for example, relating to multiple users. Also, although the process flow 500 is described as being executed by the tenant LAN controller 114, it may be executed by any suitable tenant LAN controller 114, 114-1, 114-2.

In some examples, the process flow 500 is triggered when a network appliance of the tenant LAN 108 receives a packet for which it has no corresponding flow entry. This may occur, for example, if the packet is a query message packet from a user who has just become active, if the packet is a query message packet corresponding to a flow entry that has expired, etc. When the network appliance receives the packet without a corresponding flow entry, it may forward the packet to the tenant LAN controller 114. (In systems that utilize the OpenFlow protocol, this may be called a PacketIn event.) Receipt of the packet may cause the tenant LAN controller 114 to initiate the process flow 500.

According to the process flow 500, at operation 502, the tenant LAN controller 114 may access a user identifier indicating the user 102A, 102N and/or user computing device 104A, 104N that sent the packet that triggered the process flow 500. The user identifier, in some examples, is all or part of a header of the query packet. Example user identifiers include, an IP or other network address of the sender, a MAC address associated with a network interface of the user's computing device 104A, 104N, etc.

At operation 504, the tenant LAN controller 114 may access the queries that the indicated user is permitted to make. The tenant LAN controller 114 may access the queries, for example, from a copy of all or a part of the multi-tenant user query table received from the WAN controller 122, from a tenant user query table received from the tenant backend query processor 112, by querying the identity management system 142, etc.

At operation 506, the tenant LAN controller 114 may push flow entries to the network appliances of the tenant LAN to instruct the network appliances to process future query message packets from the identified user. The flow entries may instruct the network appliances to assign the identified user's query messages to an appropriate queue. Query messages including queries of different types may be assigned to different queues. An example flow entry, then, may instruct a network appliance to assign to a first queue query message packets that are from the user MAC address, directed to a network address of the web application machine 131A, 131B, and on a port corresponding to a first query type. Another example flow entry may instruct a network appliance to assign to a second queue query message packets that are from the user MAC address, directed to a network address of the web application machine 131A, 131B, and on a port corresponding to a second query type.

At operation 508, the tenant LAN controller 114 may wait to receive changes to the multi-tenant user query table or tenant user query table that affect the identified user. Such changes may be received, for example, from the WAN controller 122, the tenant backend query processor 112 or other source. When changes are received, the tenant LAN controller 114 may determine, at operation 510, if, after the indicated changes, the user is permitted to make any queries of a query type indicating a computational weight above a threshold level. If not, the tenant LAN controller 114 may, at operation 512, downgrade flow entries relating to the user to a lower data rate queue, for example, by causing or allowing previous flow entries for the user to expire and/or by sending new flow entries to some or all of the network appliances on the tenant LAN 106. In some examples, the tenant LAN controller 114 may cancel one or more flow entries for the user.

If the identified user is permitted to make high computational weight queries, the tenant LAN controller 114 may, at operation 514, determine if the network appliances of the tenant LAN 108 include flow entries for the identified user. (For example, flow entries previously sent may have expired). If not, the tenant LAN controller 114 may, at operation 516, push flow entries to the network appliances based on the multi-tenant user query table updates received at operation 508. If flow entries for the user are at the network appliances, the tenant LAN controller 114 may wait for further multi-tenant user query table updates at operation 508.

Figure 6:
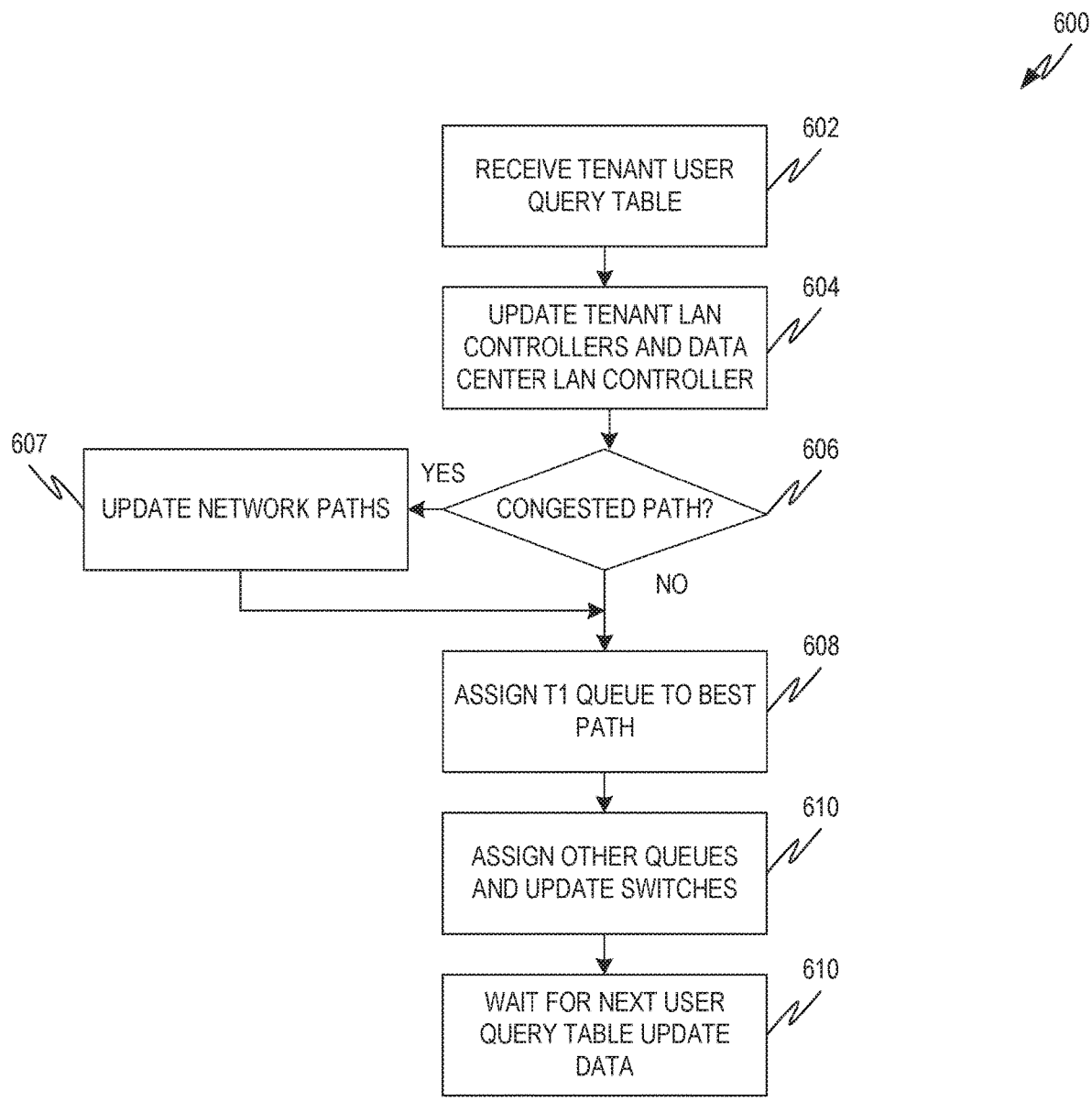
FIG. 6 is a flowchart showing one example of a process flow that may be executed by the wide area network (WAN) controller of FIG. 1 to configure the WAN.

FIG. 6 is a flowchart showing one example of a process flow 600 that may be executed by the WAN controller 122.

At operation 602, the WAN controller 122 may receive one or more tenant user query tables, for example, from a tenant backend query processor 112, 112-1, 112-2, etc. For example, a tenant user query table received at operation 602 may be from a new tenant that was not previously active and/or may include updates over a previous multi-tenant user query table. The WAN controller 122 may generate an updated multi-tenant user query table based on the received tenant user query table or tables and provide the updated multi-tenant user query table to the data center LAN controller 124 and any tenant LAN controllers, such as the tenant LAN controller 114. In some examples, the WAN controller 122 may execute the operations 602 and 604 whenever a tenant user query table is received. For example, the WAN controller 122 may interrupt its operation to execute operations 602 and 604 when a tenant user query table is received. Also, in some examples, the operations 602 and 604 may be performed by various other components of the environment 100 other than the WAN controller 122 including, for example, any suitable component of FIG. 1 or 2 or by an additional component.

At operation 606, the WAN controller 122 may determine the congestion level of one or more network paths of the WAN 118. A network path may include a set of interconnected network appliances by which a packet may traverse the WAN 118. Any suitable technique may be used to determine network path conditions. For example, the WAN controller 122 may query network appliances of one or more network paths. The network appliances may report any congestion that is present back to the WAN controller 122. In some examples, the WAN controller 122 may also measure the available bandwidth of a network path. For example, the WAN controller 122 may send packets (e.g., STATS_REQUEST packets) to network appliances on a network path. The number of reply packets received in a given amount of time may indicate the available bandwidth of the network path.

At operation 606, the WAN controller 122 may determine if any of the network paths was congested. If yes, then the WAN controller 122 may, at operation 607, select new network paths for various query types. For example, if the best network path (e.g., the network path with the highest bandwidth) is congested (e.g., has congestion over a threshold level), then the WAN controller 122 may direct queries that would have otherwise been directed to that network path to a different network path of the WAN 118. If no network paths are congested, then the WAN controller 122 may proceed to operation 608.

At operation 608, the WAN controller 122 may assign the query type with the highest computational weight to the best network path through the WAN 118. For example, as described above, the tenant LAN controller 114 may configure the tenant LAN 108 to assign query packets from different query types to different queues. The WAN controller 122 may assign query packets of a particular queue to a particular network path. In some examples, the WAN controller 122 may assign query packets specifying different ports to different network paths. The best network path may be the network path with the highest bandwidth and/or lowest congestion level. At operation 610, the WAN controller 122 may assign other query types to one or more other network paths.

The WAN controller 122 may make the assignments at operations 608 and 610, for example, by sending flow entries to various network appliances of the WAN 118. For example, a flow entry to a first network appliance on a first network path may include packet identification data indicating packets to the web application machine or machines on a particular port and/or on a particular queue. The rule data may instruct the first network appliance to forward the packet to a second network appliance on the first network path. In some examples, the WAN controller 122 may execute the process flow 600 upon the receipt of multi-tenant user query table update data. For example, after executing the process flow 600, the WAN controller 122 may execute the process flow 600 again after receiving an additional tenant user query table, for example, from one of the tenant backend query processors 112, 112-1, 112-2.

Figure 7:
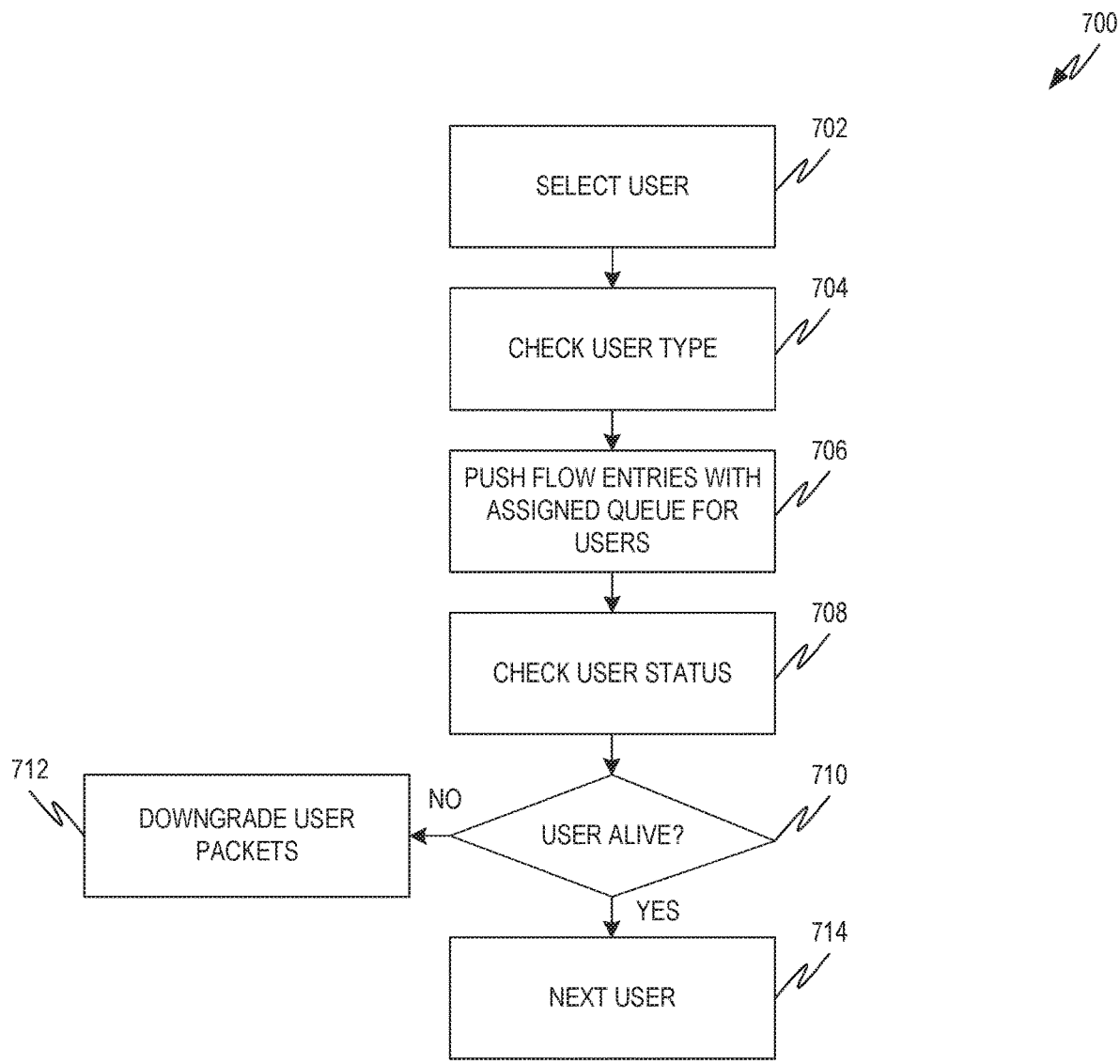
FIG. 7 is a flowchart showing one example of a process flow that may be executed by the data center LAN controller of FIG. 1 to configure the data center LAN.

FIG. 7 is a flowchart showing one example of a process flow 700 that may be executed by the data center LAN controller 124 to configure the data center LAN 126. At operation 702, the data center LAN controller 124 may select a user to consider. For example, the data center LAN controller 124 may select the considered user from the multi-tenant user query table and/or upon receiving a query message packet from the user from network appliance of the data center LAN 126, for example, at a PacketIn event. At operation 704, the data center LAN controller 124 may check a user type of the user. For example, the user may be associated with a tenant 101, 101-1, 101-2, as described herein. The type of the user may describe the type of subscription or other arrangement that the tenant has with the web application 132. In some examples, different users within the same tenant 101, 101-1, 101-2 may be assigned different user types.

At operation 706, the data center LAN controller 124 may push flow entries to some or all of the network appliances of the data center LAN 126 assigning the considered user to a queue associated with the user type determined at operation 704. For example, users with a higher priority level may be assigned to higher priority queues. At operation 708, the data center LAN controller 124 may check a status of the considered user. For example, a user may be alive if query packets from the user have been received within a threshold time, or inactive otherwise. If the user is not alive at operation 710, the data center LAN controller 124 may downgrade user packets at operation 712. For example, the data center LAN controller 124 may send flow entries to one or more network appliances of the data center LAN 126 assigning the considered user to a lower queue than the queue assigned at operation 706. If the considered user is alive, then the data center LAN controller 124 may proceed to a next user at operation 714. For example, the data center LAN controller 124 may re-execute the process flow 700 for the next user. If no users remain to be considered, in some examples, the data center LAN controller 124 may await an update to the multi-tenant user query table before re-executing the process flow 700 based on the update.

Figure 8:
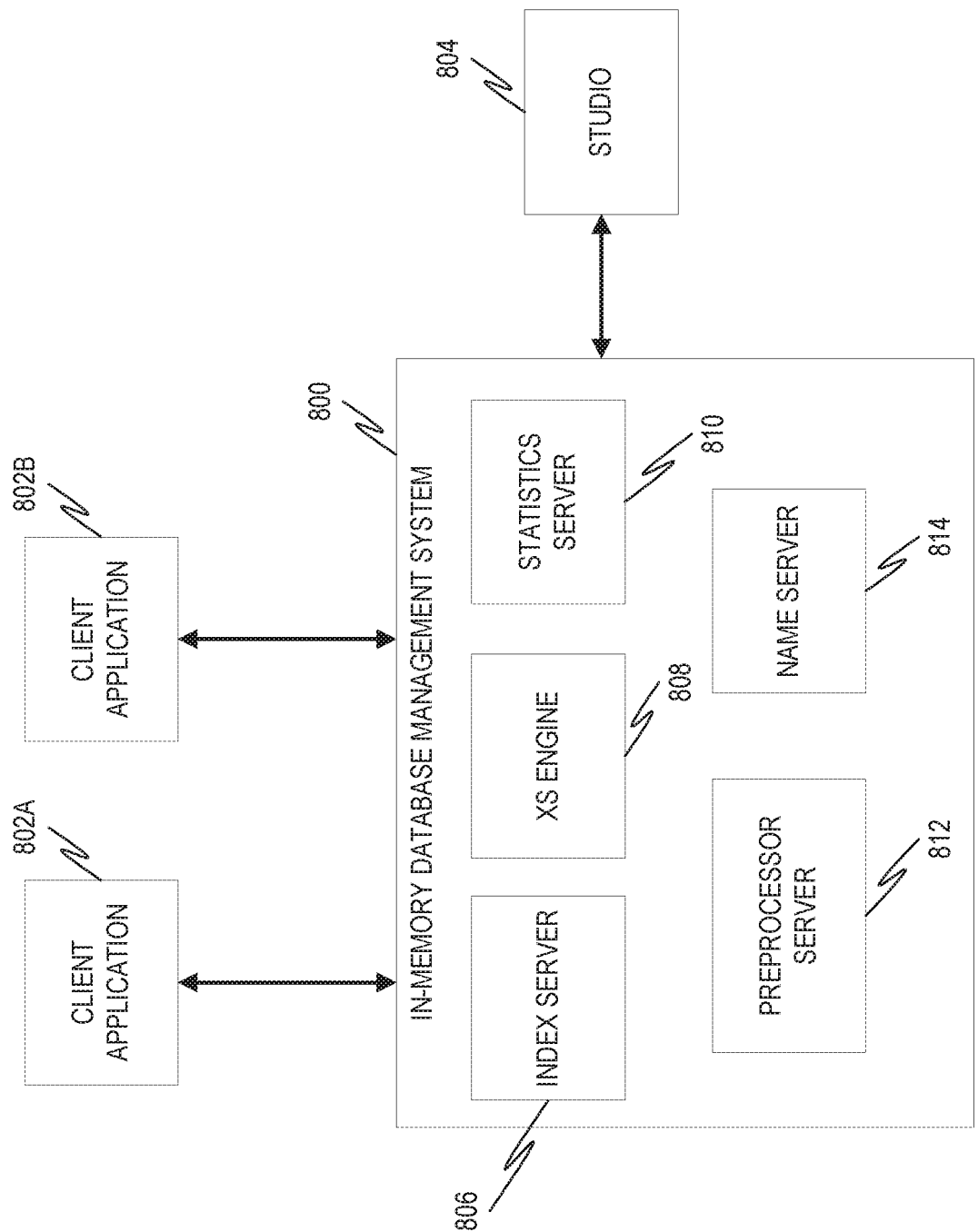
FIG. 8 is a diagram illustrating an example of an in-memory database management system 800 that may be used to implement a web application in some examples of the network virtualization systems and methods described herein.

FIG. 8 is a diagram illustrating an example of an in-memory database management system 800 that may be used to implement a web application in some examples of the network virtualization systems and methods described herein. An in-memory database stores data primarily at main memory, such as a random access memory (RAM). This is different than databases that primarily employ a disk storage mechanism. In some examples, the database management system 800 may be or include an example of the HANA system from SAP SE of Walldorf, Germany. Although various features of web applications are described herein in the context of an in-memory database, network virtualization for web application queries may be generally performed for any type of web application using any suitable type of database.

The in-memory database management system 800 may be coupled to one or more client applications 802A, 802B. For example, client applications 802A, 802B may be examples of the web application 132 described herein. Client applications 802A, 802B may execute one or more queries utilizing data from the database including, for example, presenting a user interface (UI) to one or more users, entering data, accessing data, etc. The client applications 802A, 802B may communicate with the in-memory database management system 800 through a number of different protocols, including Structured Query Language (SQL), Multidimensional Expressions (MDX), Hypertext Transfer Protocol (HTTP), Representational State Transfer (REST), Hypertext Markup Language (HTML).

FIG. 8 also shows a studio 804 that may be used to perform modeling by accessing the in-memory database management system 800. In some examples, the studio 804 may allow complex analysis to be performed on data drawn not only from real time event data and windows, but also from stored database information.

The in-memory database management system 800 may comprise a number of different components, including an index server 806, an XS engine 808, a statistics server 810, a preprocessor server 812, and a name server 814. These components may operate on a single computing device, or may be spread among multiple computing devices (e.g., separate servers). The index server 806 contains the actual data and the engines for processing the data. It may also coordinate and uses the other servers.

The XS engine 808 allows clients to connect to the in-memory database management system 800 using web protocols, such as Hypertext Transfer Protocol (HTTP). Although the XS engine 808 is illustrated as a component of the in-memory database management system 800, in some examples, the XS engine may be implemented as one or more Application Program Interfaces (APIs) and/or services positioned between the client applications 802A, 802B and the in-memory database management system 800. For example, the XS engine 808 may be configured to perform the functions of the privilege filter 118 for client requests received in languages other than SQL such as, for example, Multidimensional Expressions (MDX). Hypertext Transfer Protocol (HTTP), Representational State Transfer (REST), Hypertext Markup Language (HTML), etc.

The statistics server 810 collects information about status, performance, and resource consumption from all the other server components. The statistics server 810 can be accessed from the studio 804 to obtain the status of various alert monitors.

The preprocessor server 812 is used for analyzing text data and extracting the information on which the text search capabilities are based.

The name server 814 holds information about the database topology. This is used in a distributed system with instances of the database on different hosts. The name server 814 knows where the components are running and which data is located on which server. In an example embodiment, a separate enqueue server may operate in the manner described above with respect to enqueue servers, specifically with regard to creating and managing lightweight enqueue sessions.

Figure 9:
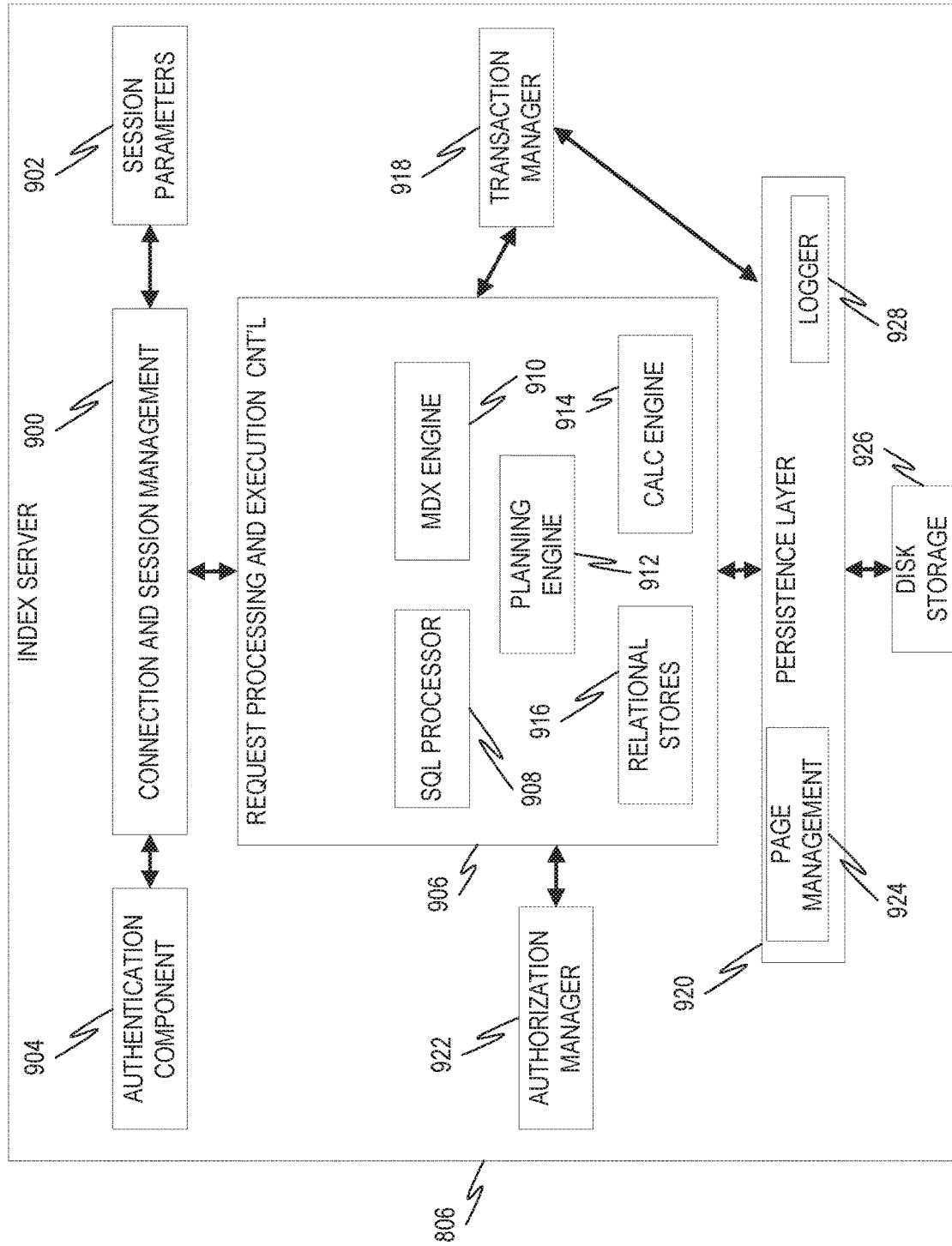
FIG. 9 is a diagram illustrating an example of the index server of FIG. 8.

The index server 806, in some examples, may house an instance of the privilege filter 118. The instance of the privilege filter 118 at the index server 806 may be in addition to or instead of the instance of the privilege filter 118 at the XS engine 808. FIG. 9 is a diagram illustrating an example of the index server 806. Specifically, the index server 806 of FIG. 8 is depicted in more detail. The index server 806 includes a connection and session management component 900, which is responsible for creating and managing sessions and connections for the database clients (e.g. client applications 802A, 802B). Once a session is established, clients can communicate with the database system using SQL statements. For each session, a set of session parameters 902 may be maintained, such as auto-commit, current transaction isolation level, etc. Users (e.g., system administrators, developers) may be authenticated by the database system itself (e.g., by logging in with log-in information such as a user name and password, using an authentication component 904) or authentication can be delegated to an external authentication provider such as a Lightweight Directory Access Protocol (LDAP) directory.

Client queries can be analyzed and executed by a set of components summarized as request processing and execution control 906. An SQL processor 908 checks the syntax and semantics of the client SQL statements and generates a logical execution plan. Multidimensional expressions (MDX) is a language for querying and manipulating multidimensional data stored in OLAP cubes. As such, an MDX engine 910 may be provided to allow for the parsing and executing of MDX commands. A planning engine 912 allows applications to execute basic planning operations in the database layer. One such operation is to create a new version of a dataset as a copy of an existing dataset, while applying filters and transformations.

A calculation engine 914 implements the various SQL script and planning operations. The calculation engine 914 creates a logical execution plan for calculation models derived from SQL script, MDX, planning, and domain-specific models. This logical execution plan may include, for example, breaking up a model into operations that can be processed in parallel. The data is stored in relational stores 916, which implement a relational database in main memory. Each SQL statement may be processed in the context of a transaction. New sessions are implicitly assigned to a new transaction. A transaction manager 918 coordinates database transactions, controls transactional isolation, and keeps track of running and closed transactions. When a transaction is committed or rolled back, the transaction manager 918 informs the involved engines about this event so they can execute needed actions. The transaction manager 918 also cooperates with a persistence layer 920 to achieve atomic and durable transactions.

An authorization manager 922 is invoked by other database system components to check whether the user has the specified privileges to execute the requested operations. The database system allows for the granting of privileges to users or roles. A privilege grants the right to perform a specified operation on a specified object.

The persistence layer 920 ensures that the database is restored to the most recent committed state after a restart and that transactions are either completely executed or completely undone. To achieve this goal in an efficient way, the persistence layer 920 uses a combination of write-ahead logs, shadow paging, and save points. The persistence layer 920 also offers a page management interface 924 for writing and reading data to a separate disk storage 926, and also contains a logger 928 that manages the transaction log. Log entries can be written implicitly by the persistence layer 920 when data is written via the persistence interface or explicitly by using a log interface.

Figure 10:
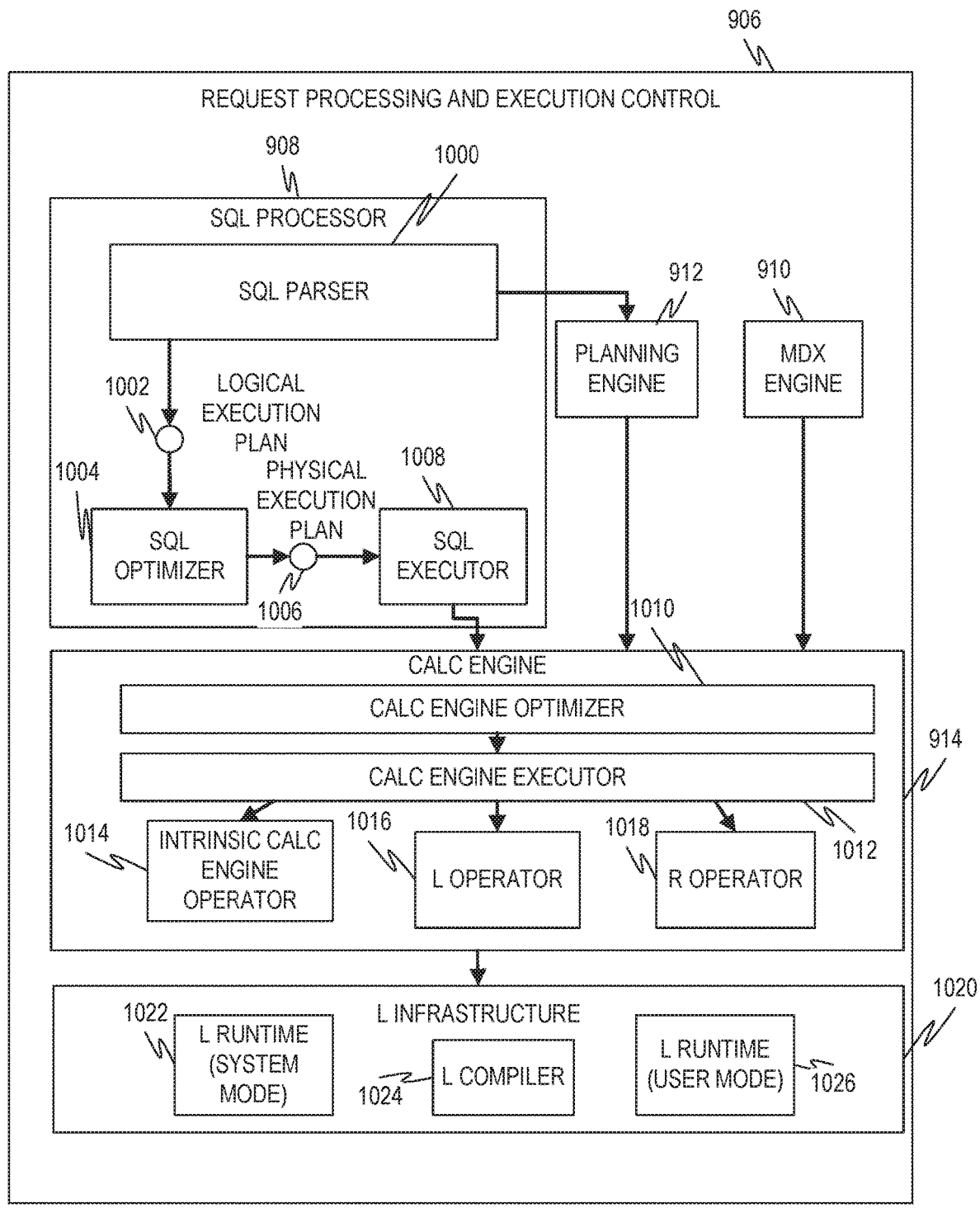
FIG. 10 is a diagram illustrating one example of the request processing and execution control of FIG. 9.

FIG. 10 is a diagram illustrating one example of the request processing and execution control 906. This diagram depicts the request processing and execution control 906 of FIG. 9 in more detail. The SQL processor 908 contains an SQL parser 1000, which parses the SQL statement and generates a logical execution plan 1002, which it passes to an SQL optimizer 1004. The SQL optimizer 1004 optimizes the logical execution plan 1002 and converts it to a physical execution plan 1006, which it then passes to a SQL executor 1008. The calculation engine 914 implements the various SQL script and planning operations, and includes a calc engine optimizer 1010, which optimizes the operations, and a calc engine executor 1012, which executes the operations, as well as an intrinsic calc engine operator 1014, an L operator 1016, and an R operator 1018.

An L infrastructure 1020 includes a number of components to aid in the running of L procedures, including an L-runtime (system mode) 1022, an L compiler 1024, and an L-runtime (User mode) 1026.

Figure 11:
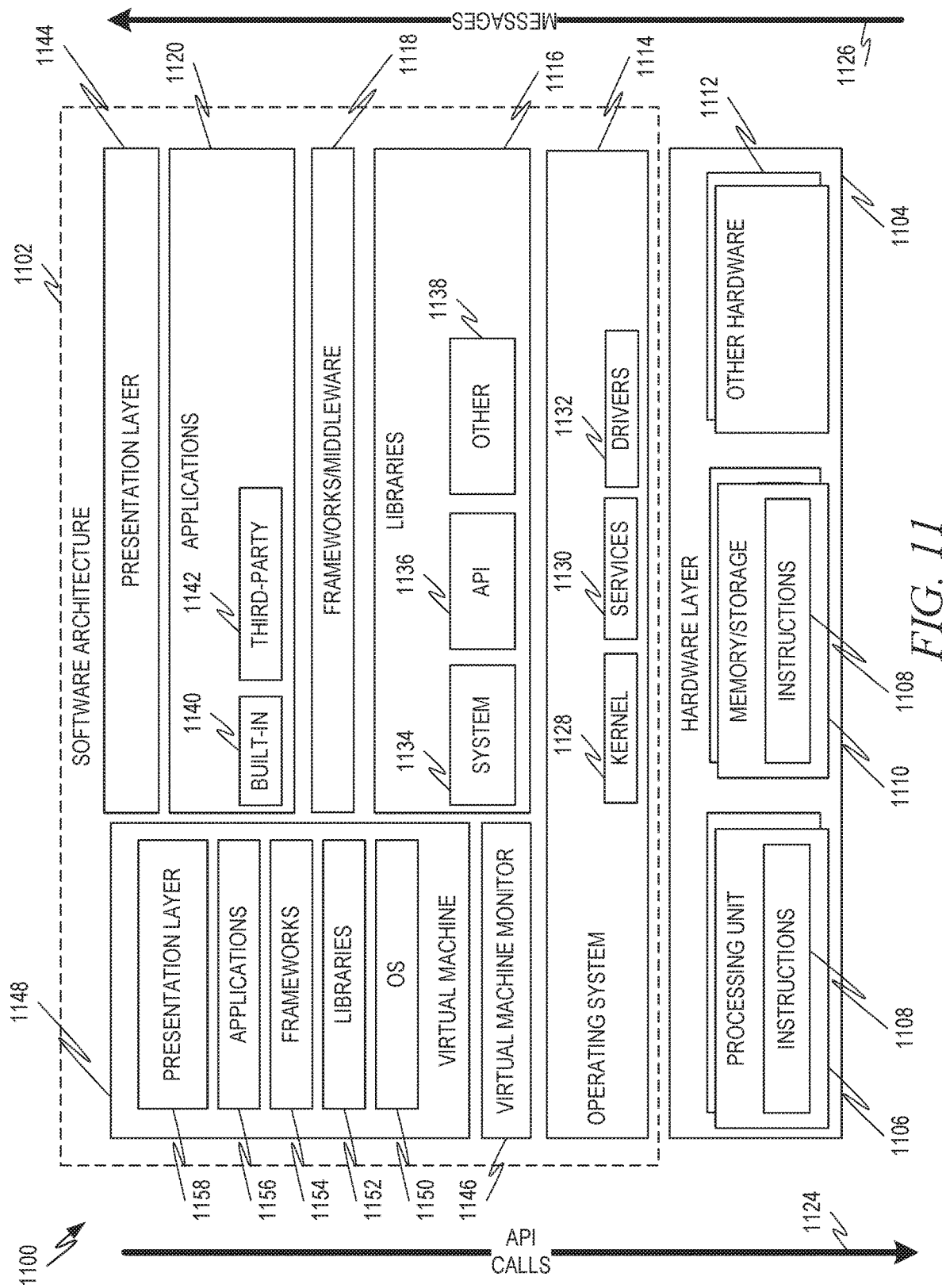
FIG. 11 is a block diagram showing one example of a software architecture for a computing device.

FIG. 11 is a block diagram 1100 showing one example of a software architecture 1102 for a computing device. The architecture 1102 maybe used in conjunction with various hardware architectures, for example, as described herein. FIG. 11 is merely a non-limiting example of a software architecture and many other architectures may be implemented to facilitate the functionality described herein. A representative hardware layer 1104 is illustrated and can represent, for example, any of the above referenced computing devices. In some examples, the hardware layer 1104 may be implemented according to the architecture of the computer system 1200 of FIG. 12.

The representative hardware layer 1104 comprises one or more processing units 1106 having associated executable instructions 1108. Executable instructions 1108 represent the executable instructions of the software architecture 1102, including implementation of the methods, modules, subsystems, and components, and so forth described herein and may also include memory and/or storage modules 1110, which also have executable instructions 1108. Hardware layer 1104 may also comprise other hardware as indicated by other hardware 1112 which represents any other hardware of the hardware layer 1104, such as the other hardware illustrated as part of computer system 1200.

In the example architecture of FIG. 11, the software architecture 1102 may be conceptualized as a stack of layers where each layer provides particular functionality. For example, the software architecture 1102 may include layers such as an operating system 1114, libraries 1116, frameworks/middleware 1118, applications 1120 and presentation layer 1144. Operationally, the applications 1120 and/or other components within the layers may invoke application programming interface (API) calls 1124 through the software stack and access a response, returned values, and so forth illustrated as messages 1126 in response to the API calls 1124. The layers illustrated are representative in nature and not all software architectures have all layers. For example, some mobile or special purpose operating systems may not provide a frameworks/middleware layer 1118, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers.

In some examples, the services 1130 include an interrupt service. The interrupt service may detect the receipt of an interrupt and, in response, cause the architecture 1102 to pause its current processing and execute an interrupt service routine (ISR) when an interrupt is accessed.

The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1116 may provide a common infrastructure that may be utilized by the applications 1120 and/or other components and/or layers. The libraries 1116 typically provide functionality that allows other software modules to perform tasks in an easier fashion than to interface directly with the underlying operating system 1114 functionality (e.g., kernel 1128, services 1130 and/or drivers 1132). The libraries 1116 may include system 1134 libraries (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 9D in a graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules. In some examples, libraries 1138 may provide one or more APIs serviced by a message oriented middleware.

The frameworks 1118 (also sometimes referred to as middleware) may provide a higher-level common infrastructure that may be utilized by the applications 1120 and/or other software components/modules. For example, the frameworks 1118 may provide various graphic user interface (GUI) functions, high-level resource management, high-level location services, and so forth. The frameworks 1118 may provide a broad spectrum of other APIs that may be utilized by the applications 1120 and/or other software components/modules, some of which may be specific to a particular operating system or platform.

The applications 1120 includes built-in applications 1140 and/or third party applications 1142. Examples of representative built-in applications 1140 may include, but are not limited to, a contacts application, a browser application, a book reader application, a location application, a media application, a messaging application, and/or a game application. Third party applications 1142 may include any of the built in applications as well as a broad assortment of other applications. In a specific example, the third party application 1142 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third party application 1142 may invoke the API calls 1124 provided by the mobile operating system such as operating system 1114 to facilitate functionality described herein.

The applications 1120 may utilize built in operating system functions (e.g., kernel 1128, services 1130 and/or drivers 1132), libraries (e.g., system 1134, APIs 1136, and other libraries 1138), frameworks/middleware 1118 to create user interfaces to interact with users of the system. Alternatively, or additionally, in some systems interactions with a user may occur through a presentation layer, such as presentation layer 1144. In these systems, the application/module "logic" can be separated from the aspects of the application/module that interact with a user.

Some software architectures utilize virtual machines. In the example of FIG. 11, this is illustrated by virtual machine 1148. A virtual machine creates a software environment where applications/modules can execute as if they were executing on a hardware computing device. A virtual machine is hosted by a host operating system (operating system 1114) and typically, although not always, has a virtual machine monitor 1146, which manages the operation of the virtual machine as well as the interface with the host operating system (i.e., operating system 1114). A software architecture executes within the virtual machine such as an operating system 1150, libraries 1152, frameworks/middleware 1154, applications 1156 and/or presentation layer 1158. These layers of software architecture executing within the virtual machine 1148 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 12:
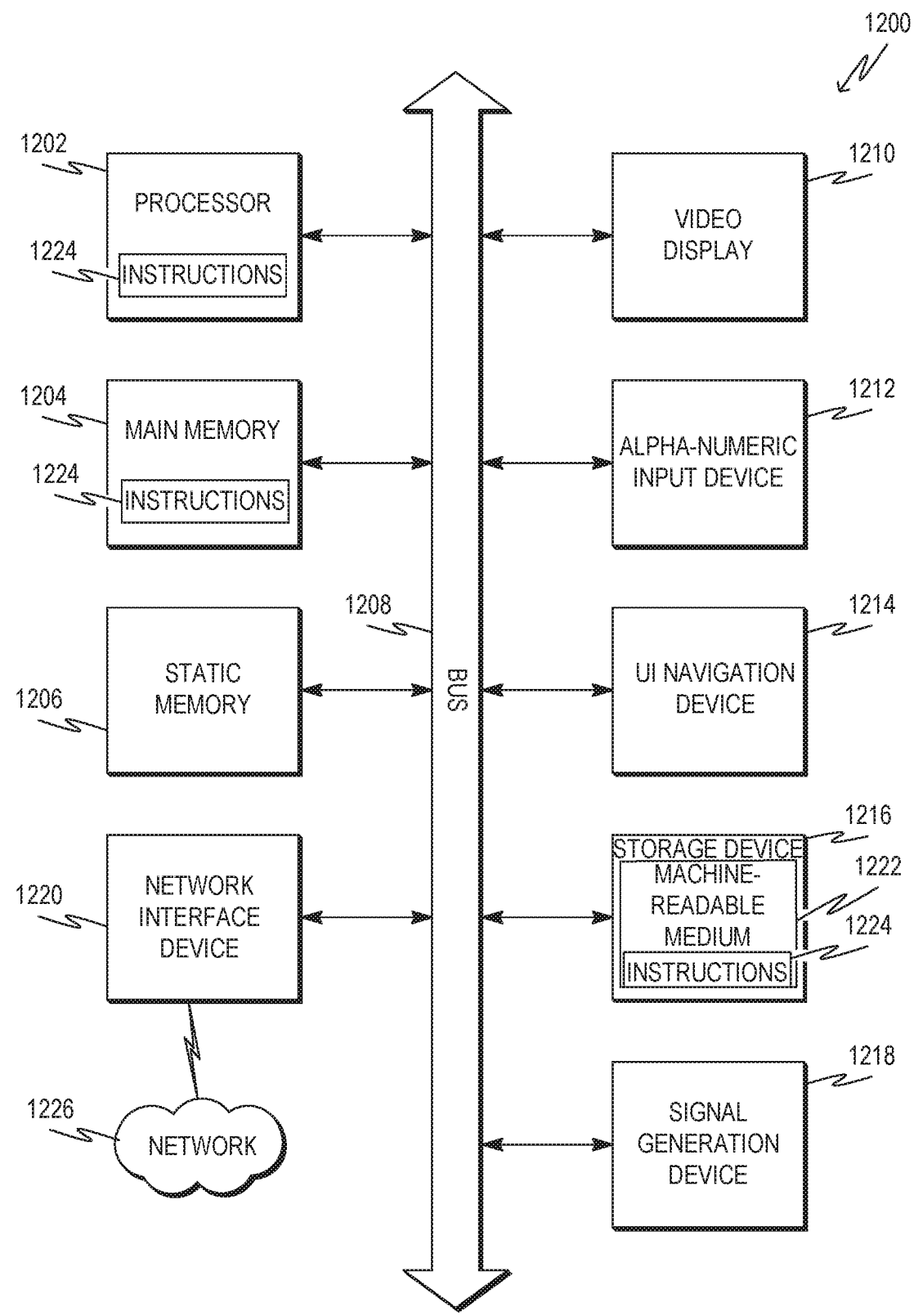
FIG. 12 is a block diagram of a machine in the example form of a computer system within which instructions may be executed for causing the machine to perform any one or more of the methodologies discussed herein.

FIG. 12 is a block diagram of a machine in the example form of a computer system 1200 within which instructions 1224 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU), or both), a main memory 1204, and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard or a touch-sensitive display screen), a user interface (UI) navigation (or cursor control) device 1214 (e.g., a mouse), a disk drive unit 1216, a signal generation device 1218 (e.g., a speaker), and a network interface device 1220.

Machine-Readable Medium

The disk drive unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the computer system 1200, with the main memory 1204 and the processor 1202 also constituting machine-readable media 1222.

While the machine-readable medium 1222 is shown in an example embodiment to be a single medium, the term "machine-readable medium" may include a single medium or multiple media (e.g., a centralized or distributed database, and/or associated caches and servers) that store the one or more instructions 1224 or data structures. The term "machine-readable medium" shall also be taken to include any tangible medium that is capable of storing, encoding, or carrying instructions 1224 for execution by the machine and that cause the machine to perform any one or more of the methodologies of the present disclosure, or that is capable of storing, encoding, or carrying data structures utilized by or associated with such instructions 1224. The term "machine-readable medium" shall accordingly be taken to include, but not be limited to, solid-state memories, and optical and magnetic media. Specific examples of machine-readable media 1222 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1224 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

EXAMPLES

Example 1 is a system for web application network management, the system comprising: a data center computing system comprising at least one processor and at least one memory in communication with the at least one processor, wherein the data center computing system is programmed to execute a wide area network (WAN) controller programmed to perform operations comprising: receiving, from a tenant computing system, a first tenant user query table, wherein the first tenant user query table describes a first set of query types for a first user, wherein the first set of query types comprises a first query type having a first computational weight and a second query type having a second computational weight less than the first computational weight; determining that a first network path to a web application data center is less congested that a second network path to the web application data center; sending a first flow entry to a first network appliance on the first network path, wherein the first flow entry comprises: first identification data describing a first set of packets associated with queries of the first query type; and an instruction that the first network appliance on the first network path is to send the first set of packets to a second network appliance on the first network path; and sending a second flow entry to a first network appliance on the second network path, wherein the second flow entry comprises: second identification data describing a second set of packets associated with queries of the second query type; and an instruction that the first network appliance on the second network path is to send the second set of packets to a second network appliance on the second network path.

In Example 2, the subject matter of Example 1 optionally includes wherein the first flow entry also comprises an instruction that the first network appliance is to assign the first set of packets to a first queue, and wherein the second flow entry comprises an instruction that the second network appliance is to assign the second set of packets to a second queue.

In Example 3, the subject matter of any one or more of Examples 1-2 optionally includes wherein the first identification data comprises: an indication of a first destination port; and an indication of the first user.

In Example 4, the subject matter of any one or more of Examples 1-3 optionally includes wherein the WAN controller is further programmed to perform operations comprising: generating a user query table based at least in part on the first tenant user query table; and sending the user query table to a data center local area network (LAN) controller.

In Example 5, the subject matter of any one or more of Examples 1-4 optionally includes wherein the WAN controller is further programmed to perform operations comprising: generating a user query table based at least in part on the first tenant user query table; and sending the user query table to a tenant LAN controller.

In Example 6, the subject matter of any one or more of Examples 1-5 optionally includes wherein the data center computing system is further programmed to execute a data center LAN controller, and wherein the data center LAN controller is programed to perform operations comprising: receiving a user query table that is based at least in part on the first tenant user query table; accessing a first priority level of the first user; and sending a first data center LAN flow entry to a first data center LAN network appliance, wherein the first data center LAN flow entry is based at least in part on the first priority level of the first user and the first query type.

In Example 7, the subject matter of any one or more of Examples 1-6 optionally includes the tenant computing system, wherein the tenant computing system is programmed to execute a tenant LAN controller, and wherein the tenant LAN controller is programmed to perform operations comprising: receiving a user query table that is based at least in part on the first tenant user query table; determining a first user identifier associated with the first user; sending a first tenant flow entry to a first tenant LAN network appliance, wherein the first tenant flow entry comprises first tenant packet identification data describing a first tenant set of packets associated with the first query type from the first user and an instruction that the first tenant LAN network appliance is to assign the first tenant set of packets to a first queue; and sending a second tenant flow entry to a second tenant LAN network appliance, wherein the second tenant flow entry comprises second tenant packet identification data describing a second tenant set of packets of the second query type from the first user and an instruction that the first tenant LAN network appliance assign the second tenant set of packets to a second queue.

In Example 8, the subject matter of Example 7 optionally includes wherein the tenant LAN controller is further programmed to perform operations comprising: receiving a modification to the user query table; determining that the modification to the user query table indicates that the first set of query types for the first user no longer includes the first query type; and sending a message to the first tenant LAN network appliance cancelling the first tenant flow entry.

In Example 9, the subject matter of any one or more of Examples 1-8 optionally includes the tenant computing system, wherein the tenant computing system is programmed to execute a backend query processor, and wherein the backend query processor is programmed to perform operations comprising: receiving the first set of query types for a first user; determining that a first query type of the first set of query types has the first computational weight; determining that a second query type of the first set of query types has the second computational weight; and sending the first tenant user query table to the WAN controller.

Example 10 is a method for web application network management, the method comprising: receiving, by a WAN controller executed at a data center computing system and from a tenant computing system, a first tenant user query table, wherein the first tenant user query table describes a first set of query types for a first user, wherein the first set of query types comprises a first query type having a first computational weight and a second query type having a second computational weight less than the first computational weight; determining, by the WAN controller, that a first network path to a web application data center is less congested that a second network path to the web application data center; sending, by the WAN controller, a first flow entry to a first network appliance on the first network path, wherein the first flow entry comprises: first identification data describing a first set of packets associated with queries of the first query type; and an instruction that the first network appliance on the first network path is to send the first set of packets to a second network appliance on the first network path; and sending, by the WAN controller, a second flow entry to a first network appliance on the second network path, wherein the second flow entry comprises: second identification data describing a second set of packets associated with queries of the second query type; and an instruction that the first network appliance on the second network path is to send the second set of packets to a second network appliance on the second network path.

In Example 11, the subject matter of Example 10 optionally includes wherein the first flow entry also comprises an instruction that the first network appliance is to assign the first set of packets to a first queue, and wherein the second flow entry comprises an instruction that the second network appliance is to assign the second set of packets to a second queue.

In Example 12, the subject matter of any one or more of Examples 10-11 optionally includes wherein the first identification data comprises: an indication of a first destination port; and an indication of the first user.

In Example 13, the subject matter of any one or more of Examples 10-12 optionally includes generating, by the WAN controller, a user query table based at least in part on the first tenant user query table; and sending, by the WAN controller, the user query table to a data center local area network (LAN) controller.

In Example 14, the subject matter of any one or more of Examples 10-13 optionally includes generating, by the WAN controller, a user query table based at least in part on the first tenant user query table; and sending, by the WAN controller, the user query table to a tenant LAN controller.

In Example 15, the subject matter of any one or more of Examples 10-14 optionally includes receiving, by a data center LAN controller executing at the data center computing system, a user query table that is based at least in part on the first tenant user query table; accessing, by the data center LAN controller, a first priority level of the first user; and sending, by the data center LAN controller, a first data center LAN flow entry to a first data center LAN network appliance, wherein the first data center LAN flow entry is based at least in part on the first priority level of the first user and the first query type.

In Example 16, the subject matter of any one or more of Examples 10-15 optionally includes receiving, by a tenant LAN controller executing at the tenant computing system, a user query table that is based at least in part on the first tenant user query table; determining, by the tenant LAN controller, a first user identifier associated with the first user; sending, by the tenant LAN controller, a first tenant flow entry to a first tenant LAN network appliance, wherein the first tenant flow entry comprises first tenant packet identification data describing a first tenant set of packets associated with the first query type from the first user and an instruction that the first tenant LAN network appliance is to assign the first tenant set of packets to a first queue; and sending, by the tenant LAN controller, a second tenant flow entry to a second tenant LAN network appliance, wherein the second tenant flow entry comprises second tenant packet identification data describing a second tenant set of packets of the second query type from the first user and an instruction that the first tenant LAN network appliance assign the second tenant set of packets to a second queue.

In Example 17, the subject matter of Example 16 optionally includes receiving, by the tenant LAN controller, a modification to the user query table; determining, by the tenant LAN controller, that the modification to the user query table indicates that the first set of query types for the first user no longer includes the first query type; and sending, by the tenant LAN controller, a message to the first tenant LAN network appliance cancelling the first tenant flow entry.

In Example 18, the subject matter of any one or more of Examples 10-17 optionally includes receiving, by a backend query processor executing at the tenant computing system, the first set of query types for a first user; determining, by the backend query processor, that a first query type of the first set of query types has the first computational weight; determining, by the backend query processor, that a second query type of the first set of query types has the second computational weight; and sending the first tenant user query table to the WAN controller.

Example 19 is a machine-readable medium comprising instructions thereon that, when executed by a processor, cause the processor to execute operations comprising: receiving, by a WAN controller executed at a data center computing system and from a tenant computing system, a first tenant user query table, wherein the first tenant user query table describes a first set of query types for a first user, wherein the first set of query types comprises a first query type having a first computational weight and a second query type having a second computational weight less than the first computational weight; determining, by the WAN controller, that a first network path to a web application data center is less congested that a second network path to the web application data center; sending, by the WAN controller, a first flow entry to a first network appliance on the first network path, wherein the first flow entry comprises: first identification data describing a first set of packets associated with queries of the first query type; and an instruction that the first network appliance on the first network path is to send the first set of packets to a second network appliance on the first network path; and sending, by the WAN controller, a second flow entry to a first network appliance on the second network path, wherein the second flow entry comprises: second identification data describing a second set of packets associated with queries of the second query type; and an instruction that the first network appliance on the second network path is to send the second set of packets to a second network appliance on the second network path.

In Example 20, the subject matter of Example 19 optionally includes wherein the first flow entry also comprises an instruction that the first network appliance is to assign the first set of packets to a first queue, and wherein the second flow entry comprises an instruction that the second network appliance is to assign the second set of packets to a second queue.

What is claimed is:

1. A network management system for managing web application access to a database management system, the system comprising:
a data center computing system comprising at least one processor and at least one memory in communication with the at least one processor, wherein the data center computing system is programmed to execute a wide area network (WAN) controller programmed to perform operations comprising:
receiving a first tenant user query table from a backend query processor, wherein the first tenant user query table describes a first set of query types that a first user is permitted to make at the database management system;
determining, using the first tenant user query table, that a first query type of the first set of query types has a first computational weight, the first computational weight describing a first level of processing resources used by the database management system to process queries of the first query type;
determining, using the first tenant user query table, that a second query type of the first set of query types has a second computational weight less than the first computational weight, the second computational weight describing a second level of processing resources used by the database management system to process queries of the second query type;
determining that a first network path to a web application data center is less congested than a second network path to the web application data center;
sending a first flow entry to a first network appliance on the first network path, wherein the first flow entry comprises:
first identification data describing a first set of packets making up query messages from the first user that convey queries of the first query type; and
an instruction that the first network appliance on the first network path is to send the first set of packets to a second network appliance on the first network path; and
sending a second flow entry to a first network appliance on the second network path, wherein the second flow entry comprises:
second identification data describing a second set of packets making up query messages from the first user that convey queries of the second query type; and
an instruction that the first network appliance on the second network path is to send the second set of packets to a second network appliance on the second network path.

2. The system of claim 1, wherein the first flow entry also comprises an instruction that the first network appliance is to assign the first set of packets to a first queue, and wherein the second flow entry comprises an instruction that the second network appliance is to assign the second set of packets to a second queue.

3. The system of claim 1, wherein the first identification data comprises:
an indication of a first destination port; and
an indication of the first user.

4. The system of claim 1, N controller is further programmed to perform operations comprising:
generating a user query table based at least in part on the first tenant user query table; and sending the user query table to a data center local area network (LAN) controller.

5. The system of claim 1, N controller is further programmed to perform operations comprising:
generating a user query table based at least in part on the first tenant user query table; and
sending the user query table to a tenant LAN controller.

6. The system of claim 1, wherein the data center computing system is further programmed to execute a data center LAN controller, and wherein the data center LAN controller is programed to perform operations comprising:
receiving a user query table that is based at least in part on the first tenant user query table;
accessing a first priority level of the first user; and
sending a first data center LAN flow entry to a first data center LAN network appliance, wherein the first data center LAN flow entry is based at least in part on the first priority level of the first user and the first query type.

7. The system of claim 1, further comprising a tenant computing system, wherein the tenant computing system is programmed to execute a tenant LAN controller, and wherein the tenant LAN controller is programmed to perform operations comprising:
receiving a user query table that is based at least in part on the first tenant user query table;
determining a first user identifier associated with the first user;
sending a first tenant flow entry to a first tenant LAN network appliance, wherein the first tenant flow entry comprises first tenant packet identification data describing a first tenant set of packets associated with the first query type from the first user and an instruction that the first tenant LAN network appliance is to assign the first tenant set of packets to a first queue; and
sending a second tenant flow entry to a second tenant LAN network appliance, wherein the second tenant flow entry comprises second tenant packet identification data describing a second tenant set of packets of the second query type from the first user and an instruction that the first tenant LAN network appliance assign the second tenant set of packets to a second queue.

8. The system of claim 7, wherein the tenant LAN controller is further programmed to perform operations comprising:
receiving a modification to the user query table;
determining that the modification to the user query table indicates that the first set of query types for the first user no longer includes the first query type; and
sending a message to the first tenant LAN network appliance cancelling the first flow entry.

9. The system of claim 1, wherein first tenant query table is received from a backend query processor, and wherein the backend query processor is programmed to perform operations comprising:
receiving the first set of query types for a first user;
determining that a first query type of the first set of query types has the first computational weight;
determining that a second query type of the first set of query types has the second computational weight; and
sending the first tenant user query table to the WAN controller.

10. A method for managing web application network access to a database management system, the method comprising:

receiving, by a WAN controller executed at a data center computing system a first tenant user query table, wherein the first tenant user query table describes a first set of query types that a first user is permitted to make at the database management system;
determining, using the first tenant user query table, that a first query type of the first set of query types has a first computational weight, the first computational weight describing a first level of processing resources used by the database management system to process queries of the first query type;
determining, using the first tenant user query table, that a second query type of the first set of query types has a second computational weight less than the first computational weight, the second computational weight describing a second level of processing resources used b the database management system to process queries of the second query type;
determining, by the WAN controller, that a first network path to a web application data center is less congested than a second network path to the web application data center;
sending, by the WAN controller, a first flow entry to a first network appliance on the first network path, wherein the first flow entry comprises:
first identification data describing a first set of packets making up query messages from the first user that convey queries of the first query type; and
an instruction that the first network appliance on the first network path is to send the first set of packets to a second network appliance on the first network path; and
sending, by the WAN controller, a second flow entry to a first network appliance on the second network path, wherein the second flow entry comprises:
second identification data describing a second set of packets making up query messages from the first user that convey queries of the second query type; and
an instruction that the first network appliance on the second network path is to send the second set of packets to a second network appliance on the second network path.

11. The method of claim 10, wherein the first flow entry also comprises an instruction that the first network appliance is to assign the first set of packets to a first queue, and wherein the second flow entry comprises an instruction that the second network appliance is to assign the second set of packets to a second queue.

12. The method of claim 10, wherein the first identification data comprises:
an indication of a first destination port; and
an indication of the first user.

13. The method of claim 10, further comprising:
generating, by the WAN controller, a user query table based at least in part on the first tenant user query table; and
sending, by the WAN controller, the user query table to a data center local area network (LAN) controller.

14. The method of claim 10, further comprising:
generating, by the WAN controller, a user query table based at least in part on the first tenant user query table; and
sending, by the WAN controller, the user query table to a tenant LAN controller.

15. The method of claim 10, further comprising:
receiving, by a data center LAN controller executing at the data center computing system, a user query table that is based at least in part on the first tenant user query table;
accessing, by the data center LAN controller, a first priority level of the first user; and
sending, by the data center LAN controller, a first data center LAN flow entry to a first data center LAN network appliance, wherein the first data center LAN flow entry is based at least in part on the first priority level of the first user and the first query type.

16. The method of claim 10, further comprising:
receiving, by a tenant LAN controller executing at a tenant computing system, a user query table that is based at least in part on the first tenant user query table;
determining, by the tenant LAN controller; a first user identifier associated with the first user;
sending, by the tenant LAN controller, a first tenant flow entry to a first tenant LAN network appliance, wherein the first tenant flow entry comprises first tenant packet identification data describing a first tenant set of packets associated with the first query type from the first user and an instruction that the first tenant LAN network appliance is to assign the first tenant set of packets to a first queue; and
sending, by the tenant LAN controller, a second tenant flow entry to a second tenant LAN network appliance, wherein the second tenant flow entry comprises second tenant packet identification data describing a second tenant set of packets of the second query type from the first user and an instruction that the first tenant LAN network appliance assign the second tenant set of packets to a second queue.

17. The method of claim 16, further comprising:
receiving, by the tenant LAN controller; a modification to the user query table;
determining, by the tenant LAN controller, that the modification to the user query table indicates that the first set of query types for the first user no longer includes the first query type; and
sending, by the tenant LAN controller, a message to the first tenant LAN network appliance cancelling the first tenant flow entry.

18. The method of claim 10, further comprising:
receiving, by a backend query processor, the first set of query types for a first user;
determining, by the backend query processor, that a first query type of the first set of query types has the first computational weight;
determining, by the backend query processor, that a second query type of the first set of query types has the second computational weight; and
sending the first tenant user query table to the WAN controller.

19. A non-transitory machine-readable medium comprising instructions thereon that, when executed by a processor, cause the processor to execute operations comprising:
receiving, by a WAN controller executed at a data center computing system, a first tenant user query table; wherein the first tenant user query table describes a first set of query types that a first user is permitted to make at a database management system;
determining, using the first tenant user query table, that a first query type of the first set of query types has a first computational weight, the first computational weight describing a first level of processing resources used by the database management system to process queries of the first query type;
determining, using the first tenant user query table, that a second query type of the first set of query types has a second computational weight less than the first computational weight, the second computational weight describing a second level of processing resources used by the database management system to process queries of the second query type;
determining, by the WAN controller, that a first network path to a web application data center is less congested than a second network path to the web application data center;
sending, by the WAN controller, a first flow entry to a first network appliance on the first network path, wherein the first flow entry comprises:
first identification data describing a first set of packets making up query messages from the first user that convey queries of the first query type; and
an instruction that the first network appliance on the first network path is to send the first set of packets to a second network appliance on the first network path; and
sending, by the WAN controller, a second flow entry to a first network appliance on the second network path; wherein the second flow entry comprises:
second identification data describing a second set of packets making up query messages from the first user that convey queries of the second query type; and
an instruction that the first network appliance on the second network path is to send the second set of packets to a second network appliance on the second network path.

20. The machine-readable medium of claim 19, wherein the first flow entry also comprises an instruction that the first network appliance is to assign the first set of packets to a first queue, and wherein the second flow entry comprises an instruction that the second network appliance is to assign the second set of packets to a second queue.

* * * * *